United States Patent
Tietzen et al.

(10) Patent No.: US 7,857,210 B2
(45) Date of Patent: Dec. 28, 2010

(54) METHOD, SYSTEM AND COMPUTER PROGRAM FOR CLIENT ACQUISITION

(76) Inventors: Terrance Patrick Tietzen, 2700, 10155-102 Street, Edmonton, Alberta (CA) T5J 4G8; Mark Marcel Archinuk, 641 Twin Brooks Bend, Edmonton, Alberta (CA) T6J 7E2; Ronald James Mackay, 10419 28 Avenue, Edmonton, Alberta (CA) T6J 4A2; Timothy Makoto Yamamoto, 11532 37B Avenue, Edmonton, Alberta (CA) T6J 0K3

( * ) Notice: Subject to any disclaimer, the term of this patent is extended or adjusted under 35 U.S.C. 154(b) by 830 days.

(21) Appl. No.: 11/760,516

(22) Filed: Jun. 8, 2007

(65) Prior Publication Data

US 2008/0010154 A1    Jan. 10, 2008

(51) Int. Cl.
*G06K 5/00* (2006.01)
(52) U.S. Cl. ..................... 235/380; 705/14.1
(58) Field of Classification Search ............ 235/380; 705/14
See application file for complete search history.

(56) References Cited

U.S. PATENT DOCUMENTS

2003/0158818 A1 * 8/2003 George et al. ............ 705/64
2006/0253320 A1 * 11/2006 Heywood ................. 705/14

* cited by examiner

*Primary Examiner*—Daniel A Hess

(57) ABSTRACT

The present invention is a method, system and computer program whereby a loyalty program may be linked to one or more card issuers and the corresponding cardholders may be added as members. The loyalty program may also be connected to systems associated with the card issuers and one or more associated merchant acquirers. The system may be operable to enable the creation, implementation and management of one or more loyalty programs that provide benefits to members based upon transactions between the members and one or more merchants associated with the system. The merchants may be permitted to establish rules for the accrual and processing of benefits from the merchants to cardholders based upon the transactions. The present invention may further provide a method for increasing transactions within a loyalty system, and for card issuers and merchants to share the risk and costs associated with directing loyalty programs to cardholders.

13 Claims, 22 Drawing Sheets

| Joe's Sporting Goods Store | | | | | | |
|---|---|---|---|---|---|---|
| | Y | N | | | | |
| 1) How would you rate our product selection? | o | o | | | | |
| | 1 | 2 | 3 | 4 | 5 | |
| 2) How would you rate this service? | o | o | o | o | o | |
| 3) Comments? | | | | | | |
| | Y | N | | | | |
| 4) Can we contact you for additional offers and specials? | o | o | | | | |

Questions must relate to customers experience with this merchant

| Melvin's Athletic Shoe Manufacturing | | | | | | |
|---|---|---|---|---|---|---|
| | Y | N | | | | |
| 1) Have you purchased our shoes before? | o | o | | | | |
| | 1 | 2 | 3 | 4 | 5 | |
| 2) How would you rate our product? | o | o | o | o | o | |
| 3) Comments? | | | | | | |
| | Y | N | | | | |
| 4) Can we contact you for additional information? | o | o | | | | |

Questions must relate to customers experience with the corporate sponsors area of expertise
OR
They must clear the questions with the Administrator

| Bank of Alba | | | | | | |
|---|---|---|---|---|---|---|
| | Y | N | | | | |
| 1) How would you rate our service? | o | o | | | | |
| | 1 | 2 | 3 | 4 | 5 | |
| 2) How would you rate our credit card? | o | o | o | o | o | |
| 3) Comments? | | | | | | |
| | Y | N | | | | |
| 4) Can we contact you for additional offers and specials? | o | o | | | | |

Questions must relate to customers experience with the Financial institutions area of expertise

| Administrator Questions | | | | | | |
|---|---|---|---|---|---|---|
| | Y | N | | | | |
| 1) Did the loyalty system influence your visit? | o | o | | | | |
| | 1 | 2 | 3 | 4 | 5 | |
| 2) Was this your first visit? | o | o | o | o | o | |
| | Y | N | | | | |
| 3) Are you interested in earning prize entries for additional surveys? | o | o | | | | |

Figure 12 ns, financial institutions are generally interested in
METHOD, SYSTEM AND COMPUTER PROGRAM FOR CLIENT ACQUISITION This application claims priority to Canadian Patent Application No. 2,550,067, filed Jun. 9, 2007.

FIELD OF THE INVENTION

This invention relates to creation and administration of loyalty reward programs. This invention relates more particularly to creation and administration of loyalty reward programs involving a plurality of merchants and loyalty program members, including members holding financial cards from a card issuer associated with the loyalty reward program.

BACKGROUND OF THE INVENTION

It should be understood that in this disclosure the term "merchant" refers to an entity who participates in a loyalty program to build loyalty with customers, and potentially acquire new business, and in exchange is willing to provide a loyalty "benefit" (meaning in this disclosure the various type of benefits that may be associated with loyalty cards including points, whether convertible to financial rewards, or financial rewards convertible to points, cash, products, services, discounts, value add-ons for purchases of products or services, the opportunity to enter into a contest with prizes contributed by the merchants, financial institutions and/or the loyalty system operator). A "member" refers to the customer or potential customer who is a member of the referred to loyalty program. A "card issuer" refers to an entity that issues (directly or through an agent) financial cards to individuals or businesses. The card issuer is generally a financial institution, financial institution in association with a credit card company, or other entity that has a financial institution arm. "Financial cards" generally refer to credit cards, debit cards, INTERAC™ cards, stored value cards and so on. "Cardholders" refer to the individuals or businesses to whom the financial cards are issued. It should also be understood that "loyalty" is used in the broad sense to also extend to "rewards", therefore a "loyalty program" should be understood to also extend to a "reward program".

Numerous customer loyalty and customer acquisition programs are known. Customer acquisition systems also play an increasingly important role for business. Customer loyalty programs can contribute to the loyalty of existing customers, but also can play a role in acquiring new customers. One of the challenges in deploying customer loyalty programs is finding efficient ways to attract new members to the loyalty program.

There are many card issuers in the marketplace. The businesses of the various card issuers can vary significantly. Financial cards are generally issued by or issued in cooperation with financial institutions. For example: (1) financial institutions (including a financial institution associated with a source of benefits) issue financial cards directly to customers; and (2) a co-branded financial card including for example the brand of the financial institution and the brand of a source of benefits.

Financial institutions are often interested in partnering with other entities, such as sources of benefits, to make the benefits associated with their financial card competitive. This is in order to retain and attract their customers, but also in order to compete for transaction share as cardholders generally carry more than one financial card in their wallet. Transaction share in turn affects the revenue realized by the financial institution (as particularized herein). Accordingly, financial institutions tend to measure the effectiveness of their marketing efforts in connection with financial cards by analyzing incremental transactions involving their financial card.

In addition, financial institutions are generally interested in sharing profit/risk with other parties in connection with their financial card related activities. This is evidenced in the popularity of co-branded cards. Generally speaking, however, card issuers are only interested in providing access to their customer base to outside parties if there is significant financial reward, and if this access does not conflict with their own interests and/or present any risk to the customer base.

Merchants provide benefits to their customers for reasons that are not dissimilar to the factors that motivate financial institutions. Merchants are interested in attracting and maintaining customers. The cost of acquisition of a new customer for many merchants is quite high. While merchants are interested in acquiring new customers efficiently, they are often also willing to provide relatively significant benefits in exchange for a new customer relationship from an outside source.

Merchants and financial institutions often collaborate in the context of co-branded financial cards. Examples include airline/credit cards, oil company financial cards, or retail chain financial cards. From a merchant perspective, these collaborative arrangements are generally available to large national chains and are not generally available to regional chains, even though from a customer acquisition or benefits perspective such regional chains might be of interest to a financial institution. The costs associated with deploying and marketing a co-branded card require economies of scale that effectively exclude many regional co-branded financial card arrangements. From the perspective of a financial institution, the benefits associated with the co-branded financial cards are generally limited to the type of benefits made available by the one merchant or a relatively small group of associated partners. This exposes the financial institution to competition to other co-branded financial cards, especially if the merchant associated with the competing card is more popular or makes better benefits available. Also, relationships with merchants become difficult or cumbersome to replace (especially over time) thereby resulting in loss of bargaining power in the hands of the financial institution and thereby possible erosion of benefits. This contributes risk to the financial institution's card issuing operation, and also generally results in financial institutions entering into multiple co-branding relationships, which in turn adds to the associated costs.

One of the disadvantages of prior art solutions is the lack of flexibility in the manner in which transactions triggering the accrual of benefits to cardholders must occur. The benefit that a merchant participating in a loyalty program is willing to provide will depend on a particular merchant and their business objectives at a particular time, and in some cases on the special demographic attributes of the cardholders, or a particular subset of cardholders. The prior art does not enable merchants to suitably reflect these changing objectives in the manner in which benefits are accrued to cardholders in connection with financial transactions.

There is a need for an improved method to encourage members to join a loyalty program in relatively large numbers. There is also a need for an efficient method to encourage cardholders to use their financial cards in a greater number of transactions thereby protecting transactions market share. There is a further need for an improved method for financial institutions and merchants to collaborate to attract and maintain customers. There is a further need for a loyalty system that enables card issuers to build loyalty with cardholders by maximizing the benefits that are available to their cardholders via the loyalty system. Therefore there is a need for a loyalty program linked to card issuers and their cardholders that allows the participation of multiple merchants, and the flexibility that enables the benefit to the cardholder to be maximized by responding to the changing business objectives of the merchants. There is a further need for a loyalty program that enables multiple merchants to reflect their changing business objectives by dynamically modifying the rules of the loyalty program as they relate to benefits accrued by cardholders. More specifically, there is a need for a loyalty program that enables merchants to customize their loyalty program, including as it related to cardholders who become members of the loyalty program, on the fly, including based on effectiveness and incremental cost.

The extent to which merchants are willing to provide benefits to cardholders in the context of a loyalty program is enhanced if means is provided to enable merchants to verify the commercial benefit derived by the merchants. Benefits to cardholders could be increased, with resulting benefits to card issuers, if the merchants are given in accordance with the present invention the tools to measure and monitor the effectiveness and incremental cost of their activities involving benefits to cardholders. There is a need therefore for a method, system and computer program that enables merchants to monitor and verify the commercial benefit that they are deriving from benefits being provided to cardholders who are members of the a loyalty program, thereby encouraging the merchants to increase the level of benefits that they provide.

Co-Pending Canadian Application No. 2,468,386, filed on May 27, 2004, describes a "Method, System, and Computer Program for Providing a Loyalty Engine Enabling Dynamic Administration of Cross-Promotional Loyalty Programs (the "Co-Pending Patent Application"). The Co-Pending Patent Application generally describes a system, method and computer programs that permits dynamic interactions between a plurality of merchants and a plurality of members. The particular solution described in the Co-Pending Patent Application enables the merchants to dynamically customize loyalty programs based on effectiveness and incremental cost. There is a particular need for a method, system and computer program that enables the efficient creation and management of a relationship between merchants and card issuers in the context of a loyalty program for mutual benefit.

SUMMARY OF INVENTION

In one aspect, the present disclosure relates to a method for enabling a loyalty program to be linked to one or more card issuers, and thereby their cardholders, by operation of a loyalty system, the loyalty system being operable to enable the creation, implementation and management of one or more loyalty programs that provide benefits to members of the loyalty programs in connection with transactions between the members and one or more merchants associated with the loyalty system, the method comprising the steps of: registering on the loyalty system one or more card issuers; the operator of the loyalty system, the one or more card issuers, and the merchants establishing the rules for accrual and processing of benefits from the merchants to cardholders associated with the one or more card issuers in connection with transactions between the cardholders and the merchants with the loyalty system; registering on the loyalty system one or more merchant acquirers associated with the one or more card issuers; registering a plurality of the cardholders as members of the loyalty program; applying the rules to accrue and process the benefits of cardholders in connection with the transactions between the cardholders and the merchants, by operation of the loyalty system; and providing an option for the benefits to be paid to the card issuers, said card issuers optionally retaining a portion of the benefits, thereby providing an additional source of revenue to the card issuers.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

A detailed description of the preferred embodiment(s) is (are) provided herein below by way of example only and with reference to the following drawings, in which:

FIG. 12 illustrates an example survey of the present invention.

Figure 1:
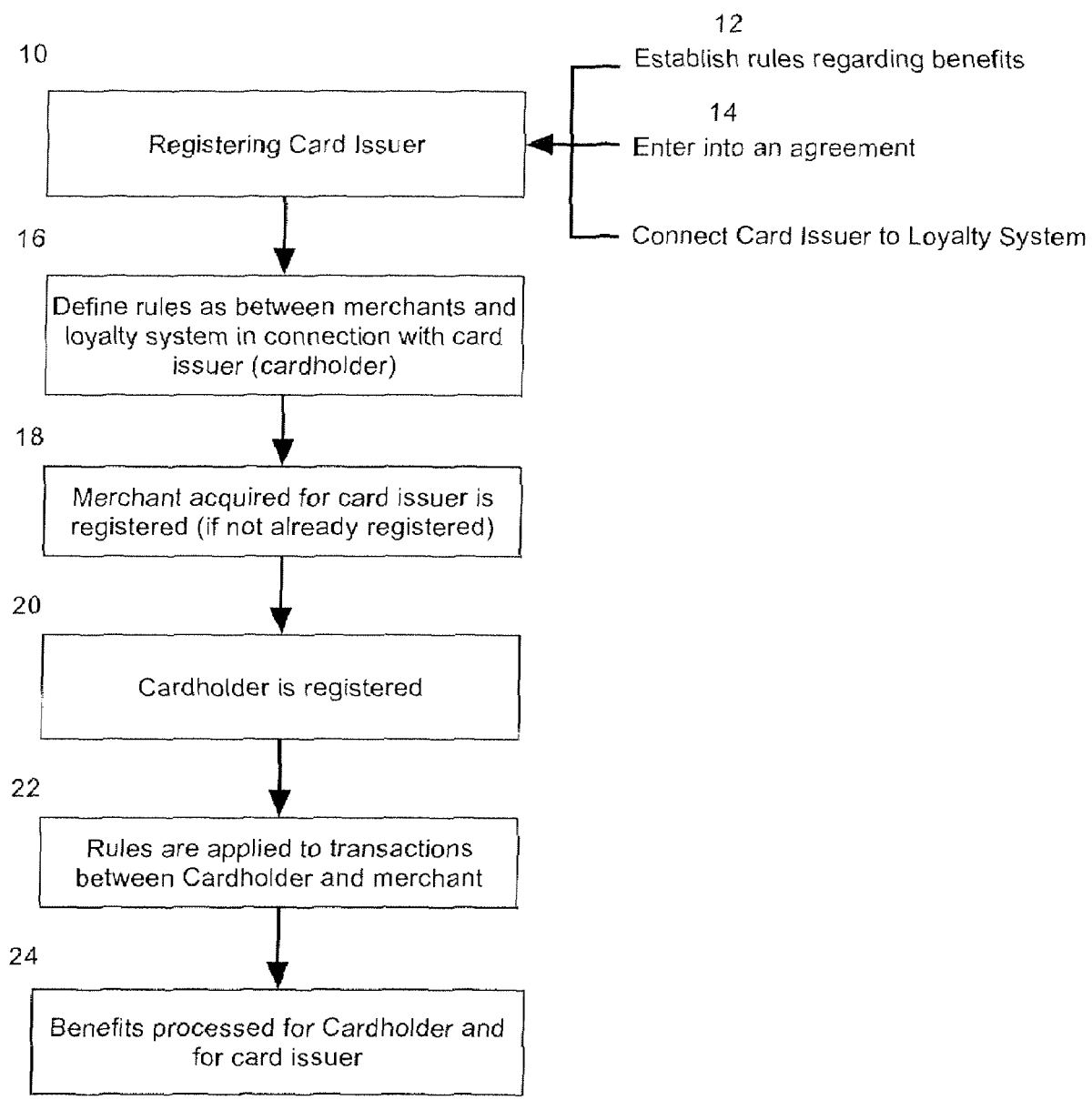
FIG. 1 is a flowchart summarizing the overall method of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is a method, system and computer program for enabling a loyalty program to be linked to one or more card issuers, and thereby their cardholders is provided. A loyalty system is provided that is operable to enable the creation, implementation and management of one or more loyalty programs that provide benefits to members of the loyalty programs in connection with transactions between the members and one or more merchants associated with the loyalty system. The method includes registering on the loyalty system one or more card issuers; the operator of the loyalty system, the one or more card issuers, and the merchants establishing the rules for accrual and processing of benefits from the merchants to cardholders associated with the one or more card issuers in connection with transactions between the cardholders and the merchants with the loyalty system; registering on the loyalty system one or more merchant acquirers associated with the one or more card issuers; registering a plurality of the cardholders as members of the loyalty program; and applying the rules to accrue and process the benefits of cardholders in connection with the transactions between the cardholders and the merchants, by operation of the loyalty system. The invention provides a method for increasing transactions within a loyalty system, as well as a method for card issuers and merchants to share the risk and costs associated with directing loyalty programs to cardholders. The method also involves connecting the loyalty system to systems associated with the card issuers and one or more associated merchant acquirers. On this basis, the method enables merchants to direct the loyalty programs or aspects thereof to specific cardholders based on BIN ranges, and based on geographic and/or time based parameters. A system and computer program for implementing the method of the invention is also provided.

FIG. 1 illustrates the general method of the present invention. A method is illustrated that enables a loyalty program to be linked to one or more card issuers, and thereby to their cardholders, by operation of a loyalty program platform or loyalty engine or loyalty system. The method includes registering on the loyalty system one or more card issuers (10). The loyalty system of the present invention already provides to a plurality of merchants associated with the loyalty system a plurality tools to customize one or more loyalty programs made available to members of the loyalty program platform (customers and potential customers of the merchants). As illustrated in FIG. 1, the operator of the loyalty program platform establishes the rules regarding the accrual of benefits from merchants to the card issuers and/or cardholders (12), and establishes a contractual relationship with the one or more card issuers (14), such contracts incorporating the rules applicable within the loyalty system in connection with the card issuers (as well as their cardholders). These rules include, for example, the term of the agreement, accrual periods, geographic area of operation (if applicable) and most importantly the particulars of the benefits (including per transaction benefits, convertibility of benefits, accrual periods, timing of obligation regarding realization of benefits etc. as particularized below) accrued to cardholders and/or card issuers.

These rules are reinforced in the arrangements entered into between the operator of the loyalty system and the various merchants so as to define the terms under which benefits will be made available to cardholders and/or card issuers.

In accordance with a particular embodiment of the present invention, the operator of the loyalty system establishes independently the rules under which the merchant shall accrue benefits for cardholders and/or card issuers, generally independently of card issuer but in conformity with the arrangements entered between the operator of the loyalty system and the card issuer (16). One of the advantages of the present invention is that the operator of the loyalty system manages the aforesaid relationships, and provides access to a technology infrastructure that enables card issuers and merchants to focus on using the tools of the loyalty system to enhance their business, rather than spending extensive resources on administrative issues.

Typically, the merchants agree to conform to commitments that they make to members that are displayed in a benefits area of a website associated with the members who are cardholders, and linked to the loyalty system. These commitments are generally made by merchants in connection with the customization of their loyalty programs by operation of the loyalty engine described in the Co-Pending Patent Application.

The merchant acquirer is also registered on the loyalty system (18), if the merchant acquirer is not already registered. The cardholders are registered as members on the loyalty system (20). This occurs in part as a result of promotion of the loyalty system to the cardholders by the card issuer, as explained below. It is important to understand that, in addition to the card issuer, in most cases there is also a "merchant acquirer", who is an entity that contracts with a merchant to process financial card transaction information, and that receives unique data not received by the card issuer.

As a further aspect of the method of the present invention, the loyalty system applies the aforementioned rules as they apply to each cardholder who is a member so as to process the applicable benefits based on applicable transactions entered into by the cardholder that are linked to the loyalty system, i.e. a qualifying transaction between a cardholder and a merchant, as determined by the aforesaid rules (22). By application of such rules, the loyalty system processes the agreed to benefits for the cardholder and/or the card issuer (24).

Figure 2A:
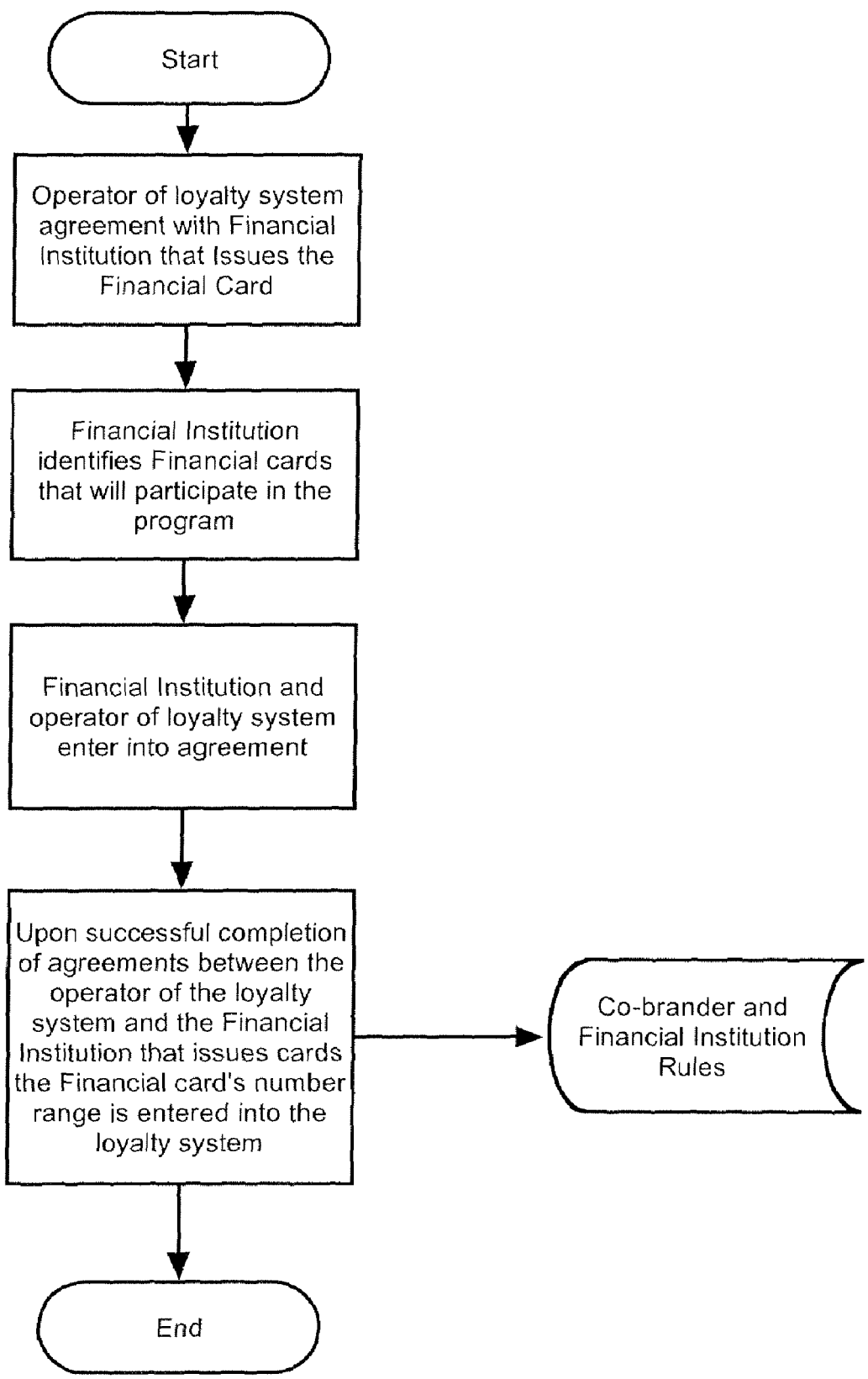
FIG. 2a illustrates a particular embodiment of the method of the present invention according to which a card issuer is registered to the loyalty system of the present invention.
Figure 2B:
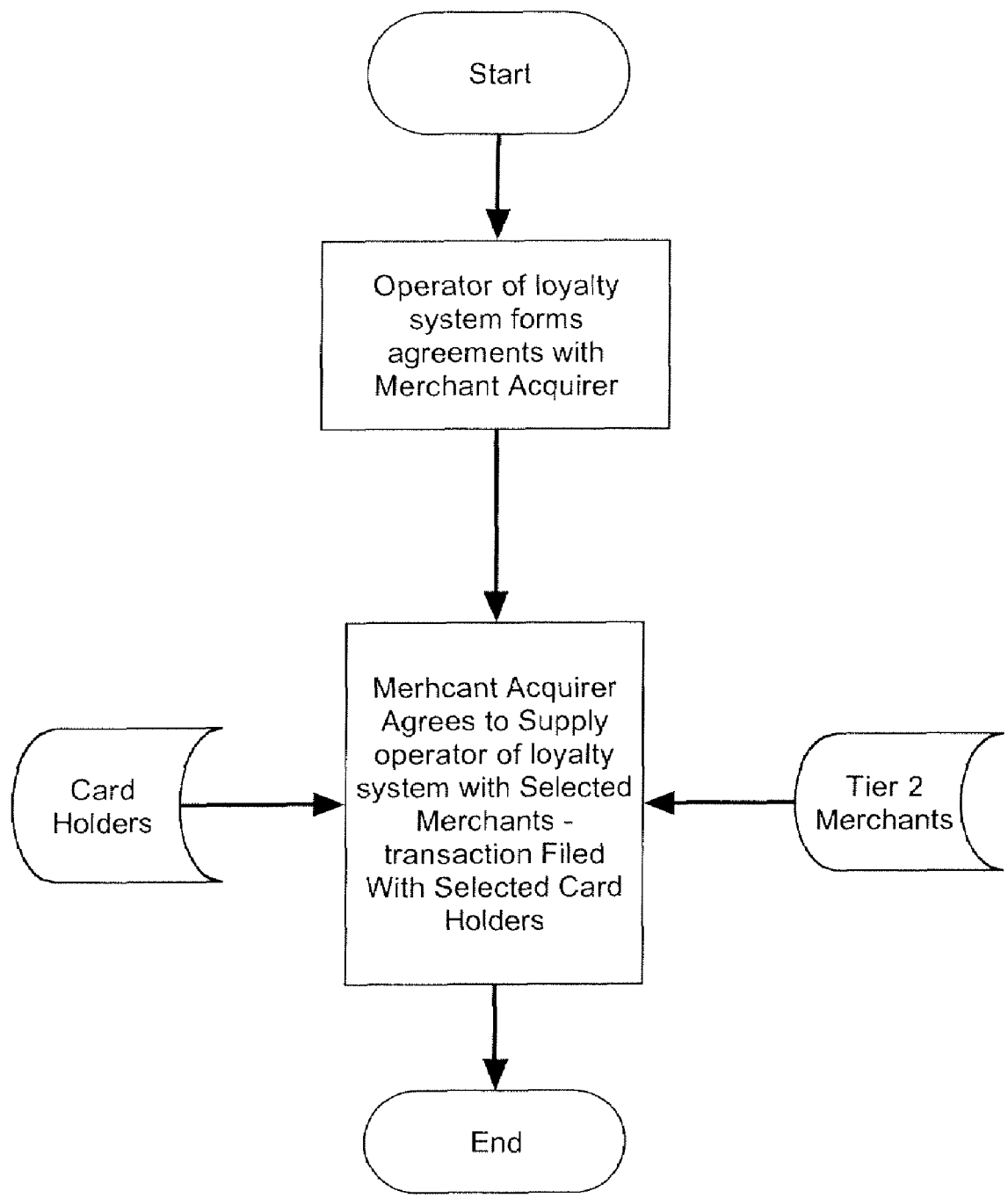
FIG. 2b illustrates a particular embodiment of the method of the present invention, according to which a merchant acquirer is registered to the loyalty system of the present invention.
Figure 2C:
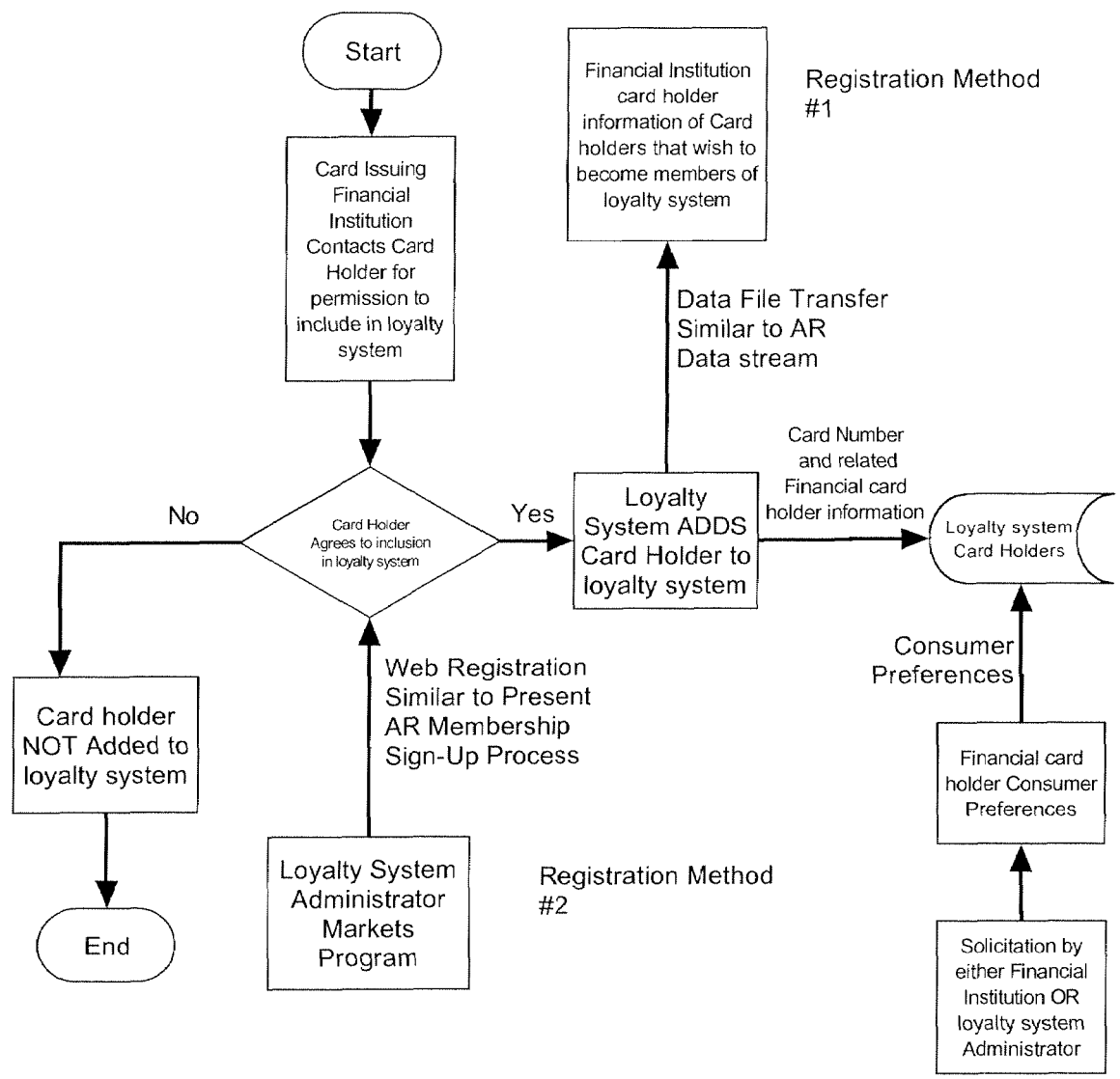
FIG. 2c illustrates a particular embodiment of the method of the present invention, according to which a merchant acquirer is registered to the loyalty system of the present invention.
Figure 2D:
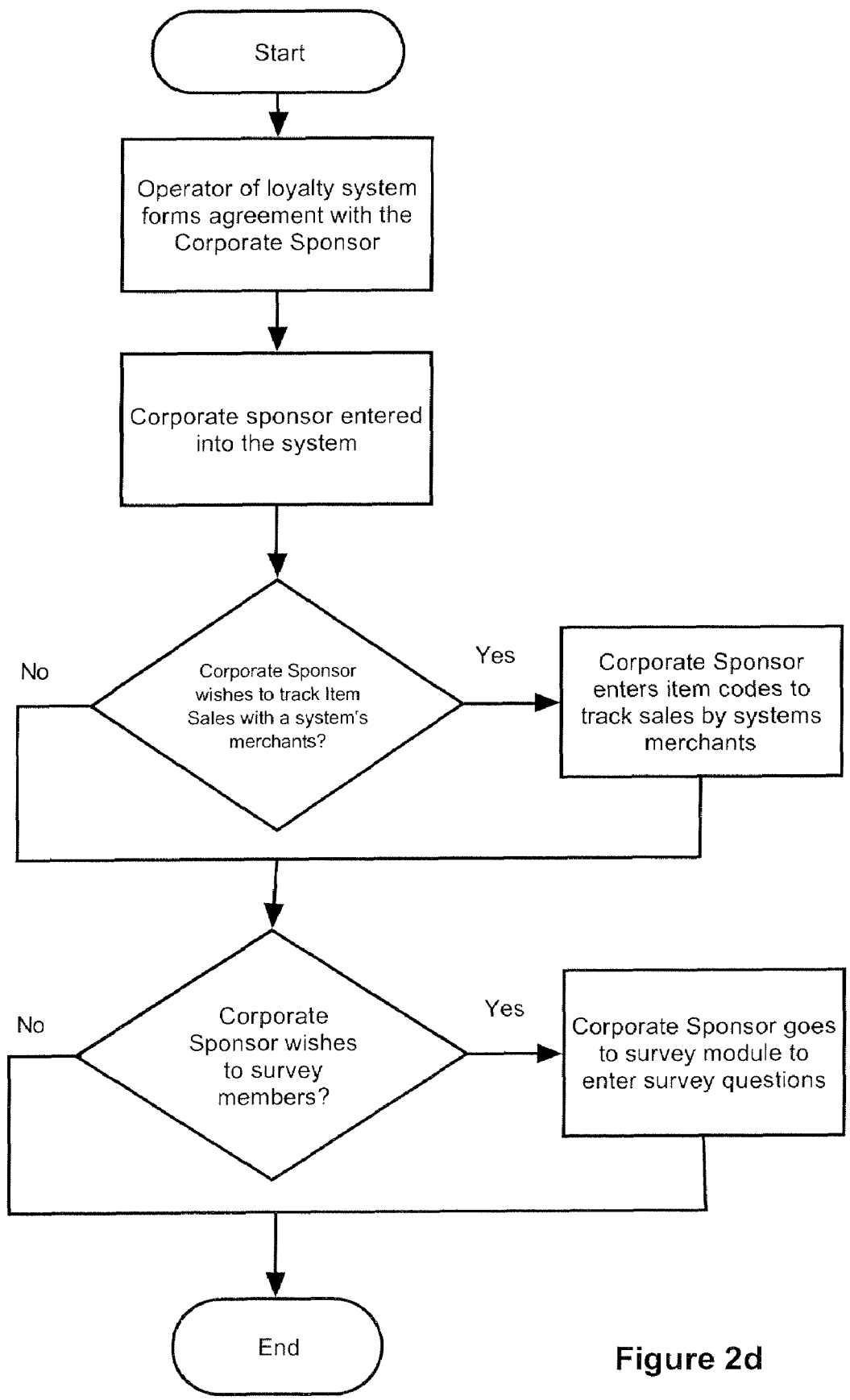
FIG. 2d is a flowchart illustrating a particular embodiment of the present invention, according to which a sponsor may utilize the system.

FIG. 2a illustrates in greater detail the particular aspect of the present invention according to which a card issuer is registered to the loyalty system. FIG. 2b illustrates a particular embodiment of the method of the present invention, according to which a merchant acquirer is registered to the loyalty system of the present invention. The role of the merchant acquirer is explained in greater details below. FIG. 2c illustrates in greater detail a particular embodiment of the present invention according to which a cardholder is registered to the loyalty system of the present invention, thereby becoming a member.

Figure 3:
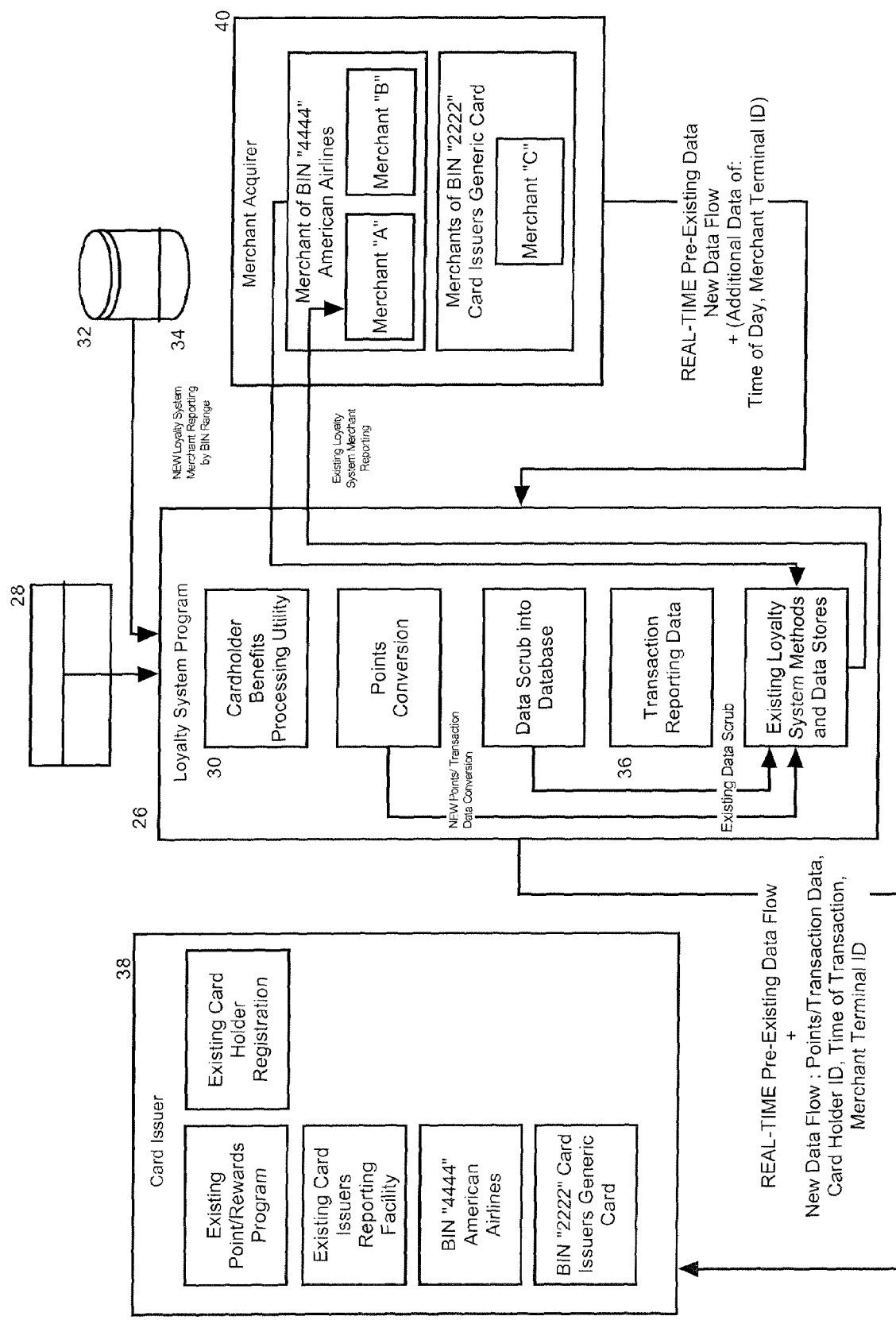
FIG. 3 is a system flowchart illustrating the resources of the system of the present invention, in one embodiment thereof.

FIG. 3 best illustrates the system of the present invention, in one particular embodiment thereof. The system is best understood as an extension of the functionality described in the Co-Pending Patent Application and therefore including generally a loyalty system (26), implemented on a server computer (28). The loyalty system (26) includes a cardholder benefits processing utility (30) of the present invention. The server computer (28) is preferably connected to the Internet. In one example of an implementation of the cardholder benefits processing utility (30), it is best understood as a software component of a web utility that provides the loyalty engine (30) particularized in the Co-Pending Patent Application. The cardholder benefits processing utility (30) is programmed in a manner that is known to those skilled in the art, and is operable to provide on the database (32) the benefits accounts (34) of the various cardholders who are members. Access to different aspects of the database (32) is provided by a known administration utility (not shown) that enables hierarchical access to the database (32), depending on permissions assigned by the operator of the loyalty system, to each of members, merchants, card issuers and merchant acquirers. The purpose of providing this access is to provide transparency to the benefits being provided to members who are cardholders by operation of the loyalty system, as particularized below. A reporting utility or transaction data reporting (36) is further linked to the cardholder benefits processing utility (30) to provide various reports of interest to merchants, merchant acquirers, card issuers and cardholders in particular, for example, by permitting merchants, merchant acquirers and card issuers to generate reports on measured performance of benefits provided to them by the loyalty system in their sphere of interest (as particularized below). One of the purposes of the reporting utility (36) is to enable the organizations linked to the loyalty system to calibrate their involvement (e.g. by merchants or card issuers calibrating the benefits that they provide) targeted to cardholders, as described in the Co-Pending Patent Application.

It should be understood that in one particular embodiment of the present invention, card issuers are also provided with the tools described in the Co-Pending Patent Application to design and implement their own loyalty programs, including cross-promotional programs in conjunction with merchants.

The system of the present invention is operable with any financial card that permits tracking of transaction information through the known card processing systems. Financial cards such as credit cards, debit cards, INTERAC™ cards, stored value cards, are designated by a BIN number range. The BIN range identifies the financial card type and the issuing financial institution. Card issuers typically market card types to certain segments of the population based upon demographic data such as credit scores, income, age and anticipated card use. Because of this the BIN range may also represent a market or demographic segment. For instance co-branded business travel cards are marketed towards persons and organizations that typically utilize the specialized features of a travel card, such as points for travel and/or specialized services to facilitate needs and wants of persons who travel regularly. Another card, the TOYS R US™ card, is provided to young families. Each financial card therefore may be used to target particular consumer needs. The unique BIN range associated with each financial card enables the use of a particular financial card to be identified within the loyalty system (as explained below). This in turn enables merchants to target particular groups of members based on demographic data extrapolated from the financial card that they are using (by operation of the BIN range associated with their card), or more particularly demographic data associated with a sub-set of cardholders using a particular financial card, possibly as communicated by the card issuer.

The preferred embodiment outlined below utilizes the BIN range of co-branded cards to develop additional transactions to selected groups of card holders and promote the use of certain financial cards for the transactions for the benefit of: cardholders, merchants, financial card issuers and merchant acquirers.

As stated earlier, in accordance with the present invention, a card issuer, and thereby one or more of its cardholders, are linked to the loyalty system, such as the loyalty system described in the Co-Pending Patent Application as further particularized herein. The loyalty programs provided by this loyalty system can run in parallel with other loyalty and rewards programs.

In numerous implementations of the present invention, no software or hardware changes are required, therefore the costs of implementation are very low. In one possible implementation of the present invention, as illustrated in FIG. 3, the loyalty system (20) is operable, via the Internet for example, to engage in real time data communications with a card issuer system (38) and/or a merchant acquirer system (40). Accordingly, in a manner known to those skilled in the art, seamless data flows between these systems can be established in order to enable the capture of financial transactions and also the accrual of benefits based on data provided to the loyalty system by each of the card issuer system (38) and the merchant acquirer system (40), as particularized below.

In a particular embodiment of the invention, the loyalty system is not only a loyalty system used by merchants but also becomes a secondary loyalty system for the card issuer for its cardholders. The system of the present invention is operable to provide system tools for the card issuer to receive payments from the merchants in connection with transactions between the merchants and the cardholders of the card issuer who are registered with the loyalty system. In other applications of the present invention, the card issuer generally receives payment from the merchants indirectly through the interchange fees collected by a merchant acquirer from the merchants at the time a transaction is processed on a financial card. In this particular embodiment the card issuer can receive payments and/or points from loyalty system merchants for transactions made by cardholders.

The card issuer may propose to encourage a specific demographic (as defined by a BIN range) to join the loyalty program. In return the merchants in the loyalty system may agree to provide additional payments to the card issuer in the form of points or cash for transactions between merchants and cardholders of a selected BIN range that have registered their financial card with the loyalty system or opted in to the applicable loyalty program. By operation of the loyalty system of the present invention, in a particular aspect of the invention, merchants have the ability to vary the amount or the percentage of the transaction accrued and paid to the card issuer, or some other aspect of the benefit provided. The payment may be in the form of cash or redeemable points. The loyalty system calculates the amount accrued to be paid to the card issuer for each cardholder who is a member by each merchant. The reporting facility provides visibility to the card issuer and the merchant in regard to the amounts accrued and subsequently paid at the end of the measurement period.

The amounts transferred to the card issuer by operation of the present invention may be re-distributed by the card issuer to the cardholders in the form of extra points for transactions completed or the card issuer may retain a percentage of the amount transferred, for example, as an administration fee. In other words, the amounts transferred can then be accrued and distributed in accordance with the card issuer's own rules therefore.

In some circumstances the card issuer and the merchants of the loyalty system may choose to offer special offers/prizes through the merchants and the loyalty system. The card issuer and the loyalty system pre-determine the conditions under which this occurs. When a registered cardholder enters into such a transaction with a merchant in connection with the loyalty system, an amount owed by the card issuer to the merchant is recorded. At the end of the reporting period the system aggregates the amounts owed to merchants by the card issuer and settlement is made and then reimbursement funds are distributed to the respective merchants.

The system results in more transactions on the particular registered financial card of the card issuer, more individuals/ businesses owning and using a financial card with a particular BIN range(s) and distribution of the cost of incentives provided the customer by the card issuer and the merchant within the loyalty system. The amounts owed the merchants or to cardholder/card issuer are tracked within the loyalty system for the accounting period.

The end result is the accrual of benefits the to the benefits account (34), which then in accordance with a particular embodiment of the present invention is disbursed on a periodic basis to the applicable card issuers (including as particularized below).

In a particular aspect of the method of the present invention, the operator of the loyalty system enters into a contract with a financial institution that has a plurality of co-branded cards and seeks new customer base potential through the financial institution's co-branded card partners that have an interest in increasing transactions on their co-branded card by attracting merchants. In this case, it is often a business limitation that products and services associated with the loyalty program for the most part will not compete with the co-branded partner's business, i.e. that the businesses involved be complementary. The financial institution contacts and motivates its customer base (cardholders) to join the loyalty program and thereby provide the loyalty system with a stream of new members. As stated earlier, the members joining the loyalty system through this referral source are associated with their co-branded card(s) within the loyalty system, each co-branded card being identified by different BIN number ranges and thereby historical demographics, credit score ranges and preferences associated with the particular card. Cardholders individually join the loyalty program and register their card.

The loyalty program uses the BIN number range and any associated demographic and credit score, along with geography and any customer preferences to direct special offers from merchants to the individual cardholders by operation of the present invention (for example: unique product/service offerings to specific customers). The loyalty system is operable when a member with a co-branded card that is within a suitable BIN number range enters into a transaction with a merchant to record the applicable transaction information, aggregate said transaction information; and supply measured results to both the merchant and the card issuer, including as particularized herein.

Typically there is comity of interest between the merchants and the card issuers, in that merchants will be willing to provide the greatest benefits to the cardholders that the card issuers are most interested in providing incentives to. Accordingly, from a card issuer perspective, the present invention provides an efficient mechanism for maximizing benefits being provided to their preferred customers by having them register with a loyalty system where merchants, in the interest of promoting their own products/services, will automatically provide optimal benefits to these preferred customers.

For example a new member, joining through a co-branded card reference, transacts with the registered financial card, and in the embodiment where the merchant and/or the co-branded issuer supply the additional benefit (which, typically being supplied through the normal co-branded card channels, consists of points, discounts or cash back). The amount paid by the merchant is usually based upon on one or more of the following: (1) the amount of the transaction; (2) the value of the transaction; and/or (3) the value of the transaction less an amount that was set as a pre-condition.

The card issuers benefits financially from the transactions involving their financial cards in numerous ways: (1) cardholders carrying credit card balances; (2) maintaining customers using the benefits and selling other products/services to such customers; (3) acquiring new customers for such products/services using benefits; (4) financial incentives provided to financial institutions in exchange for promotional access to their customers; (5) interchange fees associated with transactions involving the financial cards; (6) yearly card fees; (7) transaction fees charged to the cardholder (if applicable); (8) currency exchange fees; (9) fees payable to the card issuer by merchants (generally tied to BIN ranges); (10) augmentation of card issuer's loyalty program (reduction of costs associated with card issuer's loyalty program, i.e. replacement of card issuer paid benefits with merchant paid benefits; and (11) revenue from merchant acquirer for additional transactions involving the merchant and the merchant acquirer.

The merchant acquirer receives the benefits of: (1) additional merchants who join their processing system to increase their access to a BIN range of cardholders; (2) additional revenue from merchants (participation fees); (3) increased revenue from additional merchant transactions; (4) ability to differentiate over other merchant acquirers based on the ability to provide access to the loyalty system.

The invention provides for a linkage of a data between the loyalty system merchants and card issuers, and thereby their cardholders, facilitated through the loyalty system technology that enables a card issuer to include its cardholders in a secondary loyalty system that supplements any card issuer point system.

It should be understood that loyalty and customer acquisition programs are required to continually acquire new members, preferably at a low cost, e.g. through organic growth or through a partnership with various customer sources, including card issuers. In the instance of merchants participating in prior art loyalty program, card issuers have shown a limited willingness to share cardholder databases, both with other loyalty program operators and with participating merchants, in part because there has been no method to measure and pay them currently except through the interchange mechanism and the transaction fees, or to protect the customer.

In the card transaction process, the card issuer generally has access to the following transaction information: (1) cardholder name; (2) card number; (3) date of transaction; (4) merchant ID; (5) amount of purchase; and (6) BIN number.

While some financial institutions have both card issuing and merchant acquiring business lines, these do not necessarily work together for the common good. The merchant acquirers have access to following additional information that is not generally available to the card issuer: (1) the time of the transaction; (2) the terminal ID (within a merchant system); and (3) the fee rates charged the merchant based upon the financial card and how the financial card is used (e.g. internet transaction vs. verified signature).

In a particular aspect of the present invention, the loyalty system of the present invention is operable to link the card issuer, the cardholder, the merchant acquirer and the merchants such that the loyalty system is operable to match time of day data of a transaction with other information provided by the card issuer to the loyalty system. This functionality allows merchants to offer time of day special offers to specific cardholders who are members of the loyalty system.

In another specific aspect of the present invention, the loyalty system is operable to match the terminal ID information obtained from the merchant processor with the transaction information obtained from the card issuer. This allows a merchant and/or a card issuer to tailor benefits to specific geographic locations.

The loyalty system platform enables each of the merchants, members and card issuers to track the accrual of benefits by means of financial card transactions that in connection with the loyalty system result in the accrual of loyalty benefits, as particularized herein.

The loyalty system is operable to store the data items mentioned above (and other similar data items) to the database (32) and apply same against transactions between participating members and participating merchants.

Figure 4A:
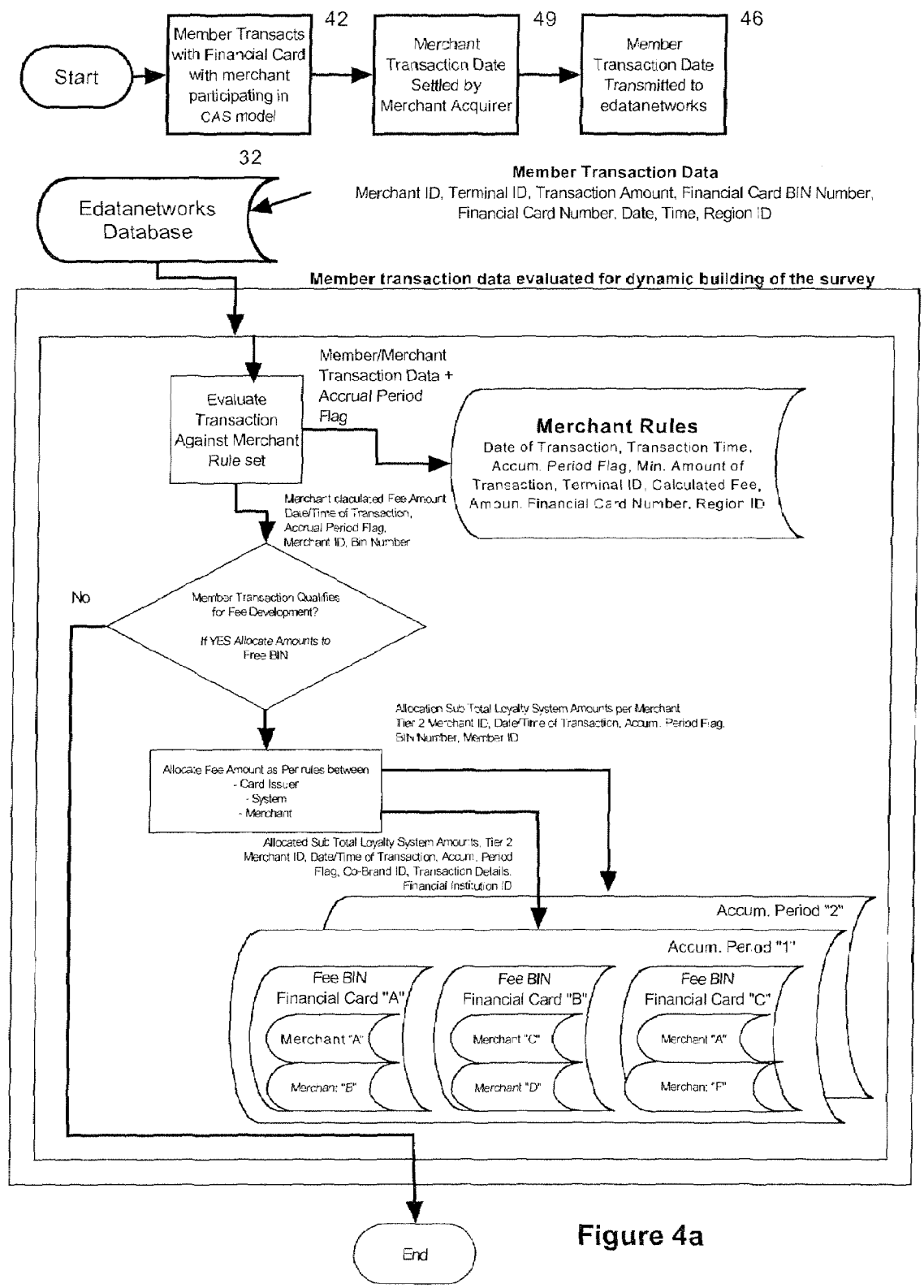
FIG. 4a illustrates the operation of the system of the present invention, in one particular embodiment thereof, specifically in connection with fee accrual.

A particular embodiment of the processes (and the system implementation thereof) related to accrual of benefits is best understood by reference to FIG. 4a. The cardholder who is a member transacts with a merchant using their financial card (40). The merchant transaction data is then usually settled by the merchant acquirer (42). The member transaction data is then preferably transmitted to the loyalty system (44). This member transaction data usually includes the data items described above. This data is then stored to the database (32), which in a preferred embodiment of the present invention is a known relational database. The rules defined for the cardholder within the loyalty system are then applied to the merchant transaction data as particularized in FIG. 4a.

As stated earlier, an agreement is entered into between the card issuer and the operator of the loyalty system on behalf of the merchants. The agreement may extend to one or more accounting periods. The agreement generally establishes the expected relationship and flow of funds between the financial institution and the merchants based on anticipated transactions, as well as the additional incentives that will be provided to the cardholders for transactions linked to the loyalty system and who will be the party covering the costs of such additional incentives and how. The agreement generally covers group of financial cards, identified by a BIN range. Also as stated earlier, cardholders are encouraged by the card issuer to join the loyalty program for additional cash rewards, points and/or special offers.

Prior to the beginning of an accounting period, and after cardholders have registered their particular financial card with the loyalty system, the agreement between the cardholder and the loyalty system is implemented by the merchants who set the offers that will be made to cardholders of certain BIN ranges (these are the merchant rules).

When a cardholder transacts with one of merchants under the applicable loyalty program, the loyalty system is operable to review the benefits applicable to the BIN number and either 1) accrue the points/cash discount (less the administration amount paid to the card issuer) to the cardholder from the transaction, by reflecting such accrual in the benefits account for the cardholder. The cardholder is notified of the award of points, and the card issuer is notified of the accrual set aside by the loyalty system to be paid by the merchant at the end of the accounting period. These amounts are separate from the amounts paid to the card issuer through the interchange system, unless a special rate for the loyalty system has been established and applied by the merchant acquirer.

The loyalty system accrues the points/special cash back awards for each cardholder and what is owed the card issuer by the merchant. Merchants generally pay cash or cash in lieu of points as a reward to the card issuer. Different incentives/rewards can apply to different BIN ranges by a single merchant or by a group of merchants.

In summary, the merchant rules applicable for a specific accrual period are applied so as to update the benefit account (34) for the particular cardholder, for example by reflecting an accrued fee in the specific embodiment of the invention illustrated in FIG. 4a. Generally speaking, the loyalty system is operable to, after an accrual period has come to an end, to verify the accrued amounts in the benefit accounts (34). These can then be accessed and displayed by members.

After an accrual period is closed, the loyalty system, in a particular embodiment of the present invention, then permits members to access the loyalty system to engage in a number of transactions in connection with their accrued benefits such as redemption, conversion of fees to points etc. A particular process and system implementation thereof for conversion of fees to points is illustrated in FIG. 4b.

Figure 4B:
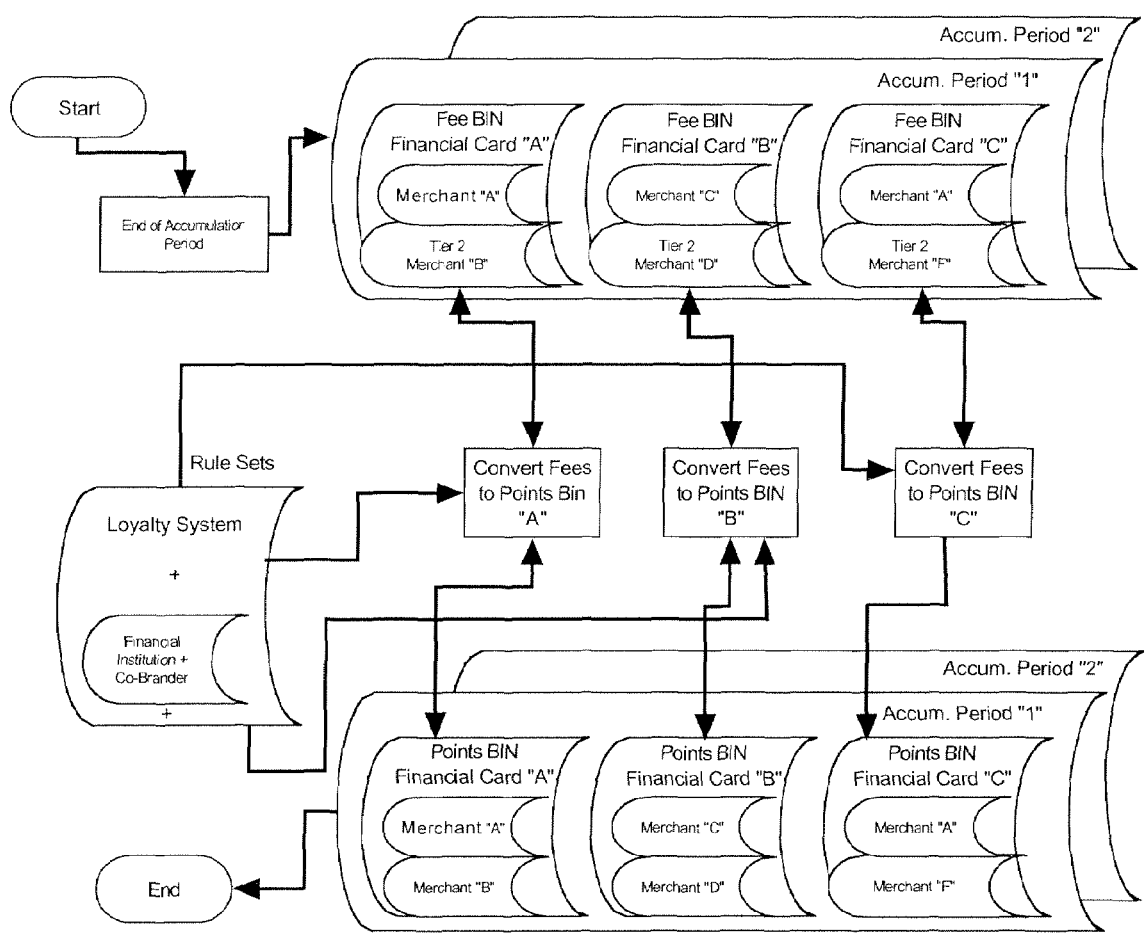
FIG. 4b illustrates the operation of the system of the present invention, in one particular embodiment thereof, specifically in connection with conversion of fees to points.

Specifically, FIG. 4b illustrates the operation of a point conversion utility that is part of the loyalty system of the present invention. The point conversion utility enables enhancement of a card issuer's exiting loyalty programs based upon points or cash back cardholder benefits created by cardholder use in connection with a loyalty program of the present invention. The point conversion utility preferably allows the card issuer to reward their cardholders in the same format as under their existing cardholder program.

For instance, some existing financial cards have points or cash reward systems or a combination of both to promote financial card use. The cardholder may accumulate points and cash rewards for later use. The loyalty system of the present invention allows for the card issuer to take all or a portion of existing fees developed from financial card use and apply them to cardholder points or cash. Alternatively, the loyalty system of the present invention could be utilized by card issuer to create an additional source of revenue from the merchant fees by not converting all of the collected fees and giving the benefit to the financial card holders.

The fee and point information is transferred to the card issuer at "X" days after the end of an accumulation period. The information is later integrated by existing financial card issuer software to consolidate the point and/or fees that are passed on to the cardholder.

The conversion from points to fees is accommodated by comparing the transaction data of identified cardholders against rule-sets created and maintained by the card issuer. The rule-sets may, for example, contain the following information regarding transaction data:

1. Transaction Amount
2. Transaction Date
3. Transaction Time

4. Merchant ID
5. Card Holder ID
6. Card BIN number

An example of a card issuer rule-set includes:
Card Holder Bin number "1111"
Min. qualifying transaction with Merchant "A" is $100.00
No Maximum qualifying transaction or conversion restrictions
Transaction must occur between 00:00:00-00:07:00 EST
Transaction must occur between Jan. 1, 2004 and Jan. 15, 2004
Card Issuer would like to give card holder 1.0 point for every dollar transacted with merchant "A"
Merchant "A"
Card Holder Id 0-10000
Card Holder BIN Number "2222"
Min. qualifying transaction with Merchant "A" is $100.00
Maximum qualifying transaction amount is $1000.00
Transaction must occur between 00:00:00-00:07:00 EST
Transaction must occur between Jan. 1, 2004 and Jan. 15, 2004
Card Issuer would like to give card holder 1.0 point for every dollar transacted with merchant "A"
Merchant "A"
Card Holder Id 0-10000
Card Holder BIN Number "3333"
Min. qualifying transaction with Merchant "A" is $100.00
Maximum qualify transaction amount is $10,000.00
Transaction must occur between 00:00:00-00:07:00 EST
Transaction must occur between Jan. 1, 2004 and Jan. 15, 2004
Card Issuer would like to record card holder $0.01 benefits for every dollar transacted with merchant "A"
Merchant "A"
Card Holder Id 0-10000

In another example of the related transaction detail:
Card Holder BIN number "1111"
Transaction Amount: $104.00
Transaction Date: Jan. 1, 2004
Transaction Time: 00:00:12
Merchant: "A"
Card Holder ID: 1
Result:
System would calculate 100 points for the transaction detail and record the Transaction information and related conversion amount 100 points In yet another example of the processing of a transaction by operation of the loyalty system of the present invention:
Transaction Detail
Card Holder BIN Number "2222"
Transaction Amount: $90.00
Transaction Date: Jan. 1, 2004
Transaction Time: 00:00:12
Merchant: "B"
Card Holder ID: 999999
Result:
System would NOT create any points for the transaction because the transaction failed to meet the criteria for point conversion for the transaction detail
  Merchant "B" is not part of the conversion rule-set
  Card holder is not part of any existing rule-sets In yet another example of the processing of a transaction by operation of the loyalty system of the present invention:
Transaction Detail
Card Holder BIN Number "3333"
Transaction Amount: $900.00
Transaction Date: Jan. 1, 2004
Transaction Time: 00:00:12
Merchant: "A"
Card Holder ID: 999999
Result:
System would record $0.90 of benefit associated with the above transaction information tied to the card holder ID number of "999999"

Figure 4C:
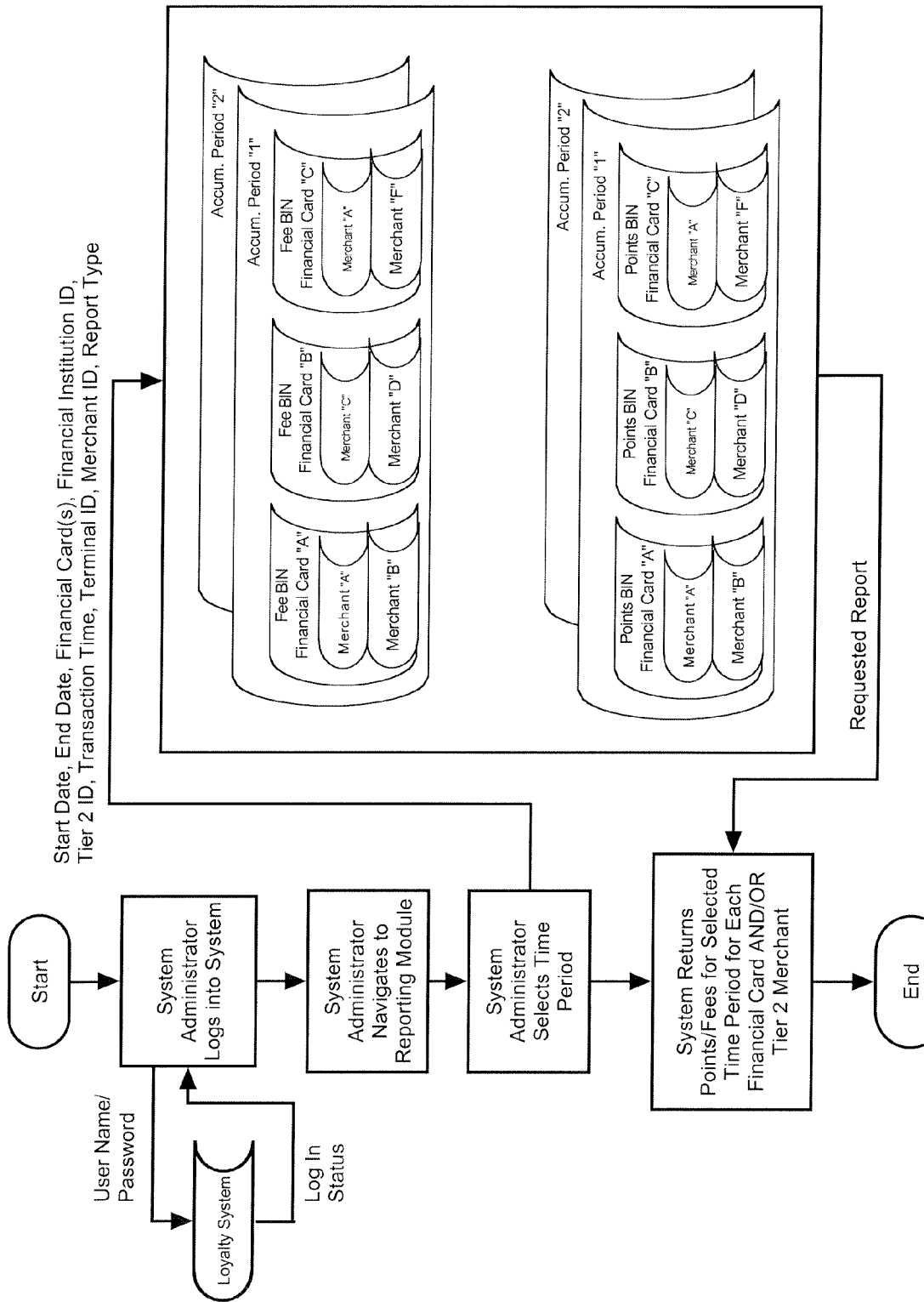
FIG. 4c illustrates the operation of the system of the present invention in one particular embodiment thereof, specifically in connection with the reporting functionality.

FIG. 4c illustrates the processes and a system implementation thereof in connection the generation of reports based on the contents of database (32). In the specific embodiment illustrated in FIG. 4c, a system administrator of the operator of the loyalty system accesses certain reports in connection with merchant activity in connection with particular BIN ranges. Similar processes and system implementations are used to generate other reports of information accessible to card issuers, merchants, members or merchant acquirers. These reports are provided in a manner that is known.

The loyalty system is operable to generate reports for card issuers to track the use and monitor the results of financial card use with identified merchants For instance a card issuer may wish to view the status of conversion of points to fees. The loyalty system, in one particular implementation thereof, allows for a System Administrator to log in and generate reports regarding the amount of fees that have been converted to points to monitor the effectiveness of the applicable loyalty program.

Example 1.0

The System Administrator enters the following parameters for report generation on behalf of the card issuer:
1) Start Date
2) End Date
3) BIN Number
4) Financial Institution ID
5) Merchant ID
6) Transaction Time
7) Transaction Terminal ID
8) Report Type The loyalty system returns the data associated with the transaction(s) to monitor the points and fees collected and converted to allow the card issuer to view data regarding the status of the system.

A card issuer may want to know which merchants are supporting a particular financial card to judge the effectiveness of the business relationship between the merchant and the cardholders. By examining the transaction information the card issuer can judge the effectiveness of having particular merchants within the loyalty system, based on collected merchant fees. A cardholder may elect to charge the merchant additional fee amounts as the merchant receives strong support from the cardholders of a particular card issuer.

The described reporting functionality can also be used to track the data necessary to integrate the data of points and fees held within the loyalty system for a given time period. A card issuer may elect to view the information to keep current information regarding benefits that are due to the cardholders.

By examining the data of accumulated points and fees a card issuer may elect to alter the conversion rules to give more benefits to the cardholders and thereby create more demand for a financial card use at a particular merchant(s). This type of reporting can also be used to prove the value to the merchants and cardholders derived from card use at an identified merchant(s).

Merchants may generally view only the information regarding the transactions that were made with identified cardholders. The loyalty system of the present invention allows for a System Administrator to see the following information:
1) Time range of transactions
2) Date range of transactions
3) BIN Range of transactions
4) Summary amounts of transactions The loyalty system generally restricts the information that the merchant can view by providing summary data only. The summary data protects the cardholders from direct exposure of private cardholder information, while allowing the merchant to view the status of the program.

For instance a merchant may wish to know how certain cards identified by BIN number are contributing to his sales. By comparing this information with historical reports and current internal customer payment methods a merchant can judge which financial card types are providing the most benefit for his organization.

Figure 4D:
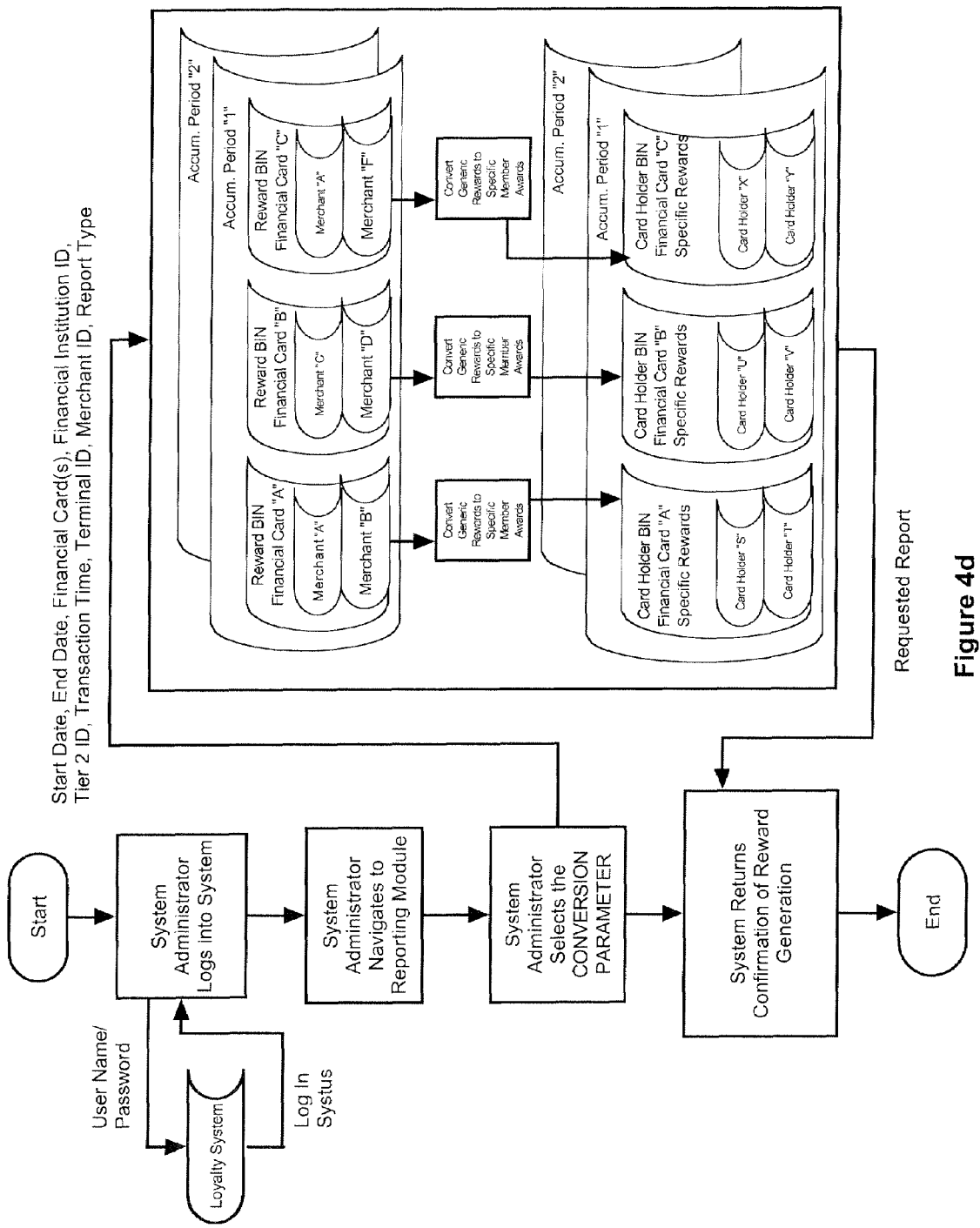
FIG. 4d illustrates the operation of the system of the present invention, in one particular embodiment thereof, specifically in connection with dynamic reward development.
Figure 5:
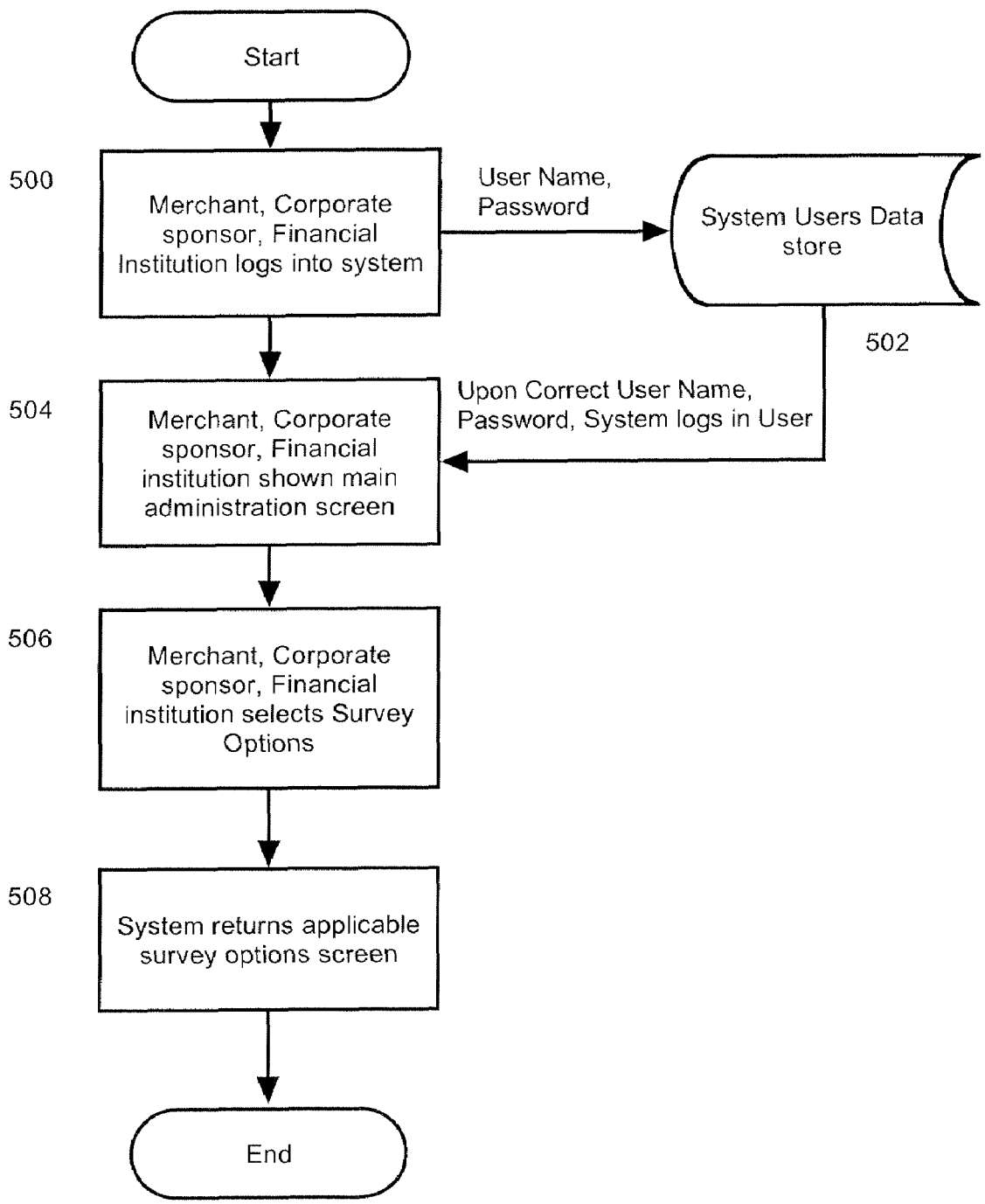
FIG. 5 is a flowchart illustrating a particular embodiment of the method of the present invention, according to which survey options may be accessed.
Figure 6:
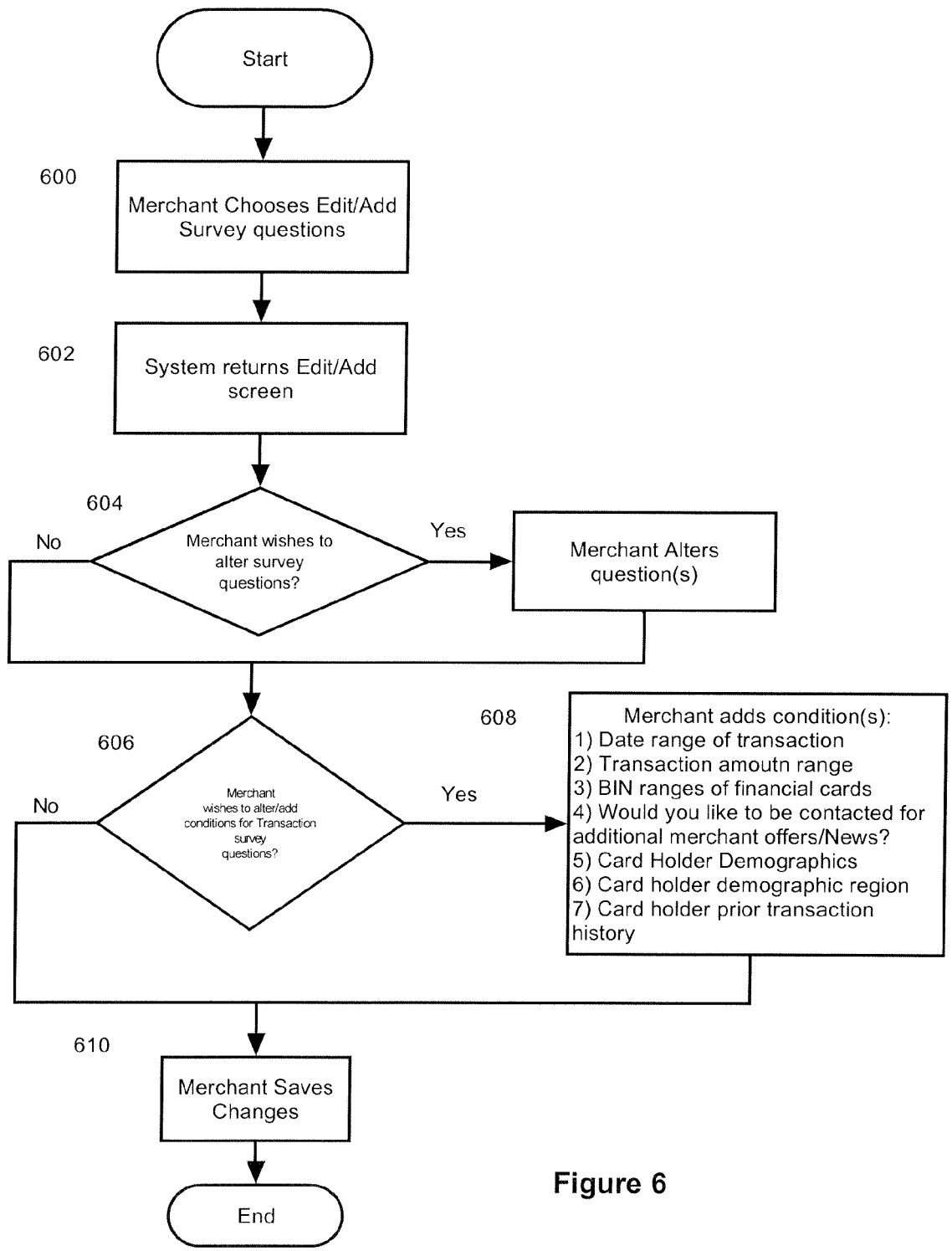
FIG. 6 is a flowchart illustrating a particular embodiment of the method of the present invention, according to which a merchant may generate transaction survey questions and set conditions for the transaction survey questions.
Figure 7:
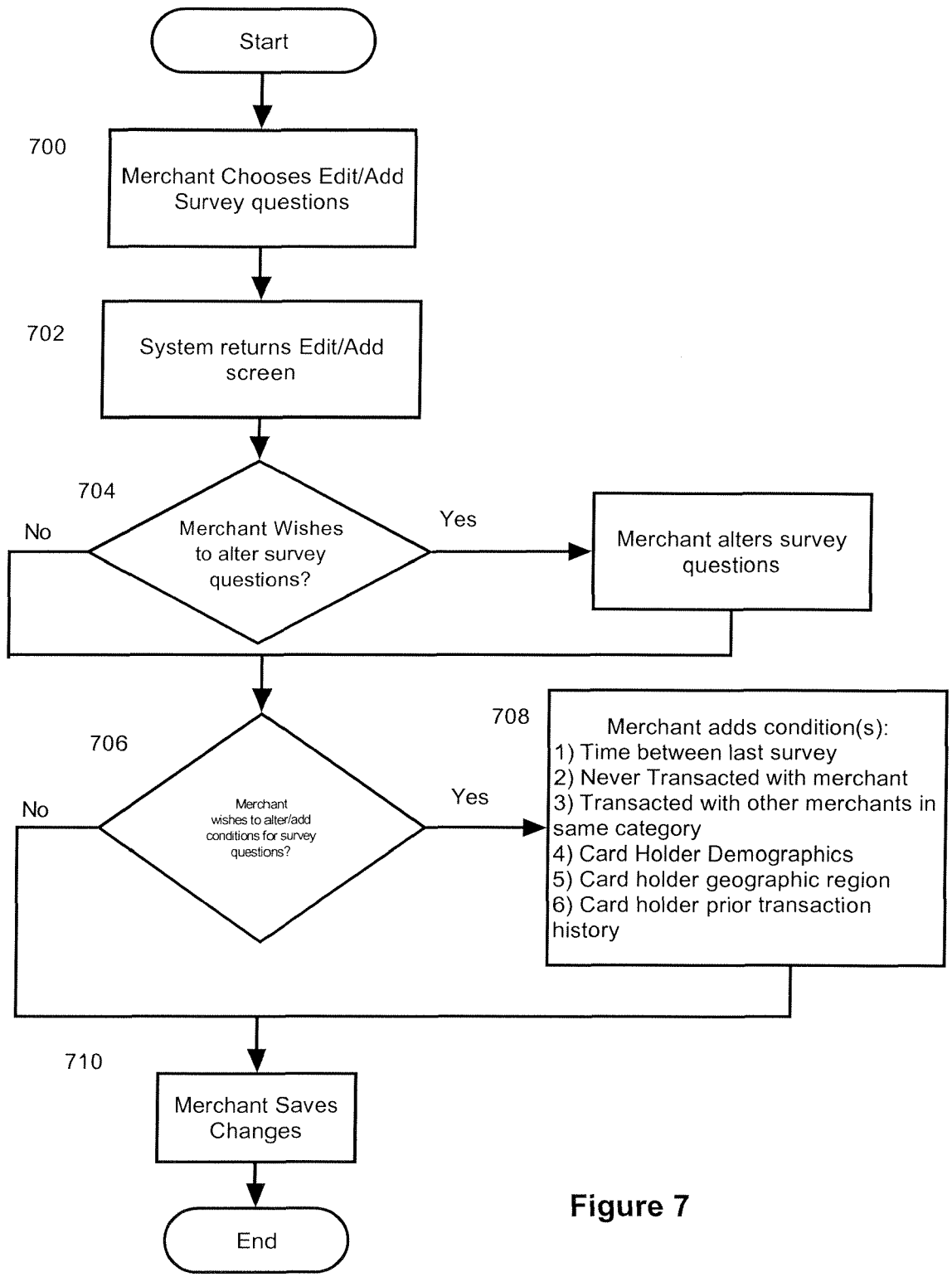
FIG. 7 is a flowchart illustrating a particular embodiment of the method of the present invention, according to which a merchant may generate survey questions and set conditions for the survey questions.
Figure 8:
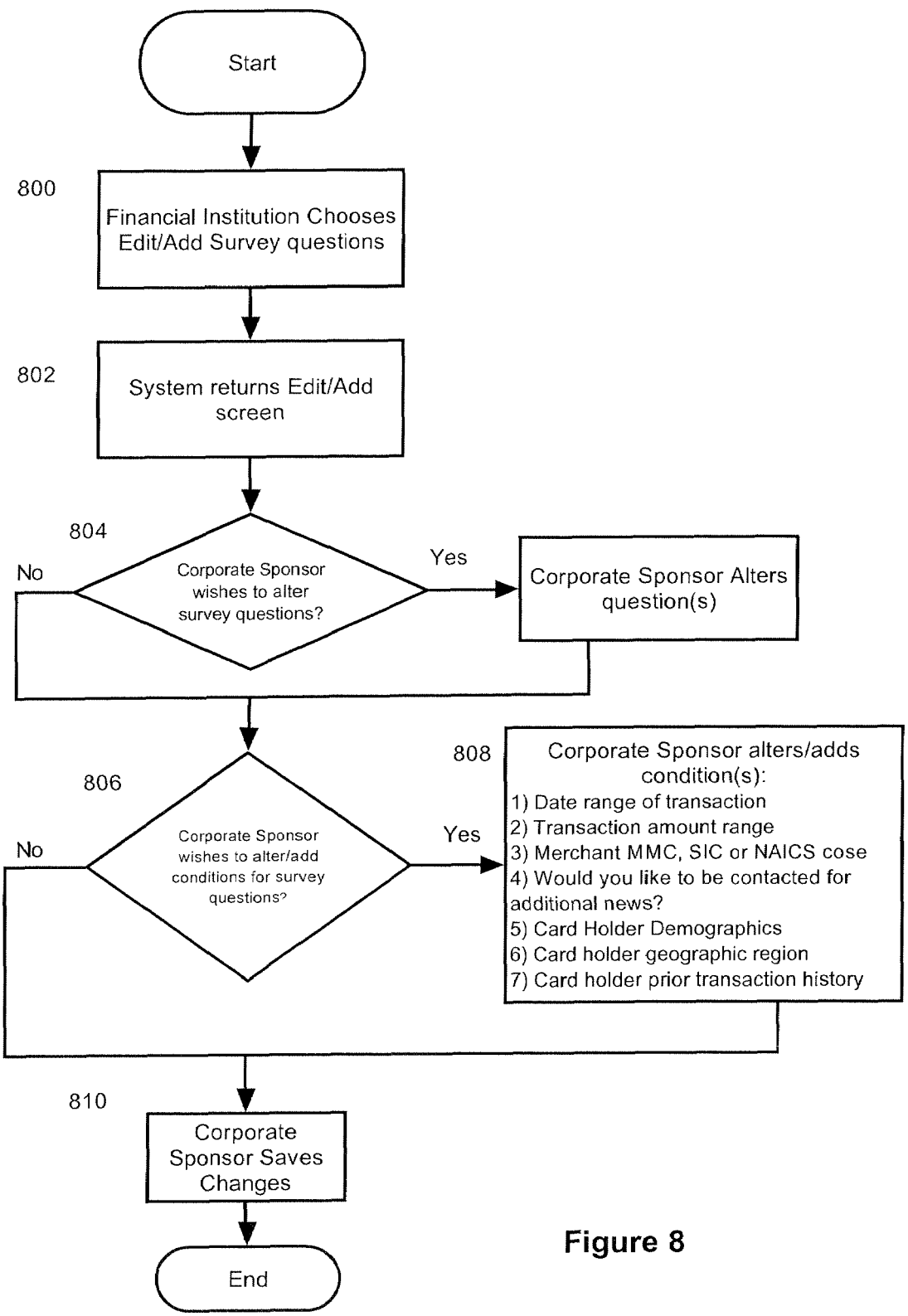
FIG. 8 is a flowchart illustrating a particular embodiment of the method of the present invention, according to which a corporate sponsor may generate transaction survey questions and set conditions for the transaction survey questions.
Figure 9:
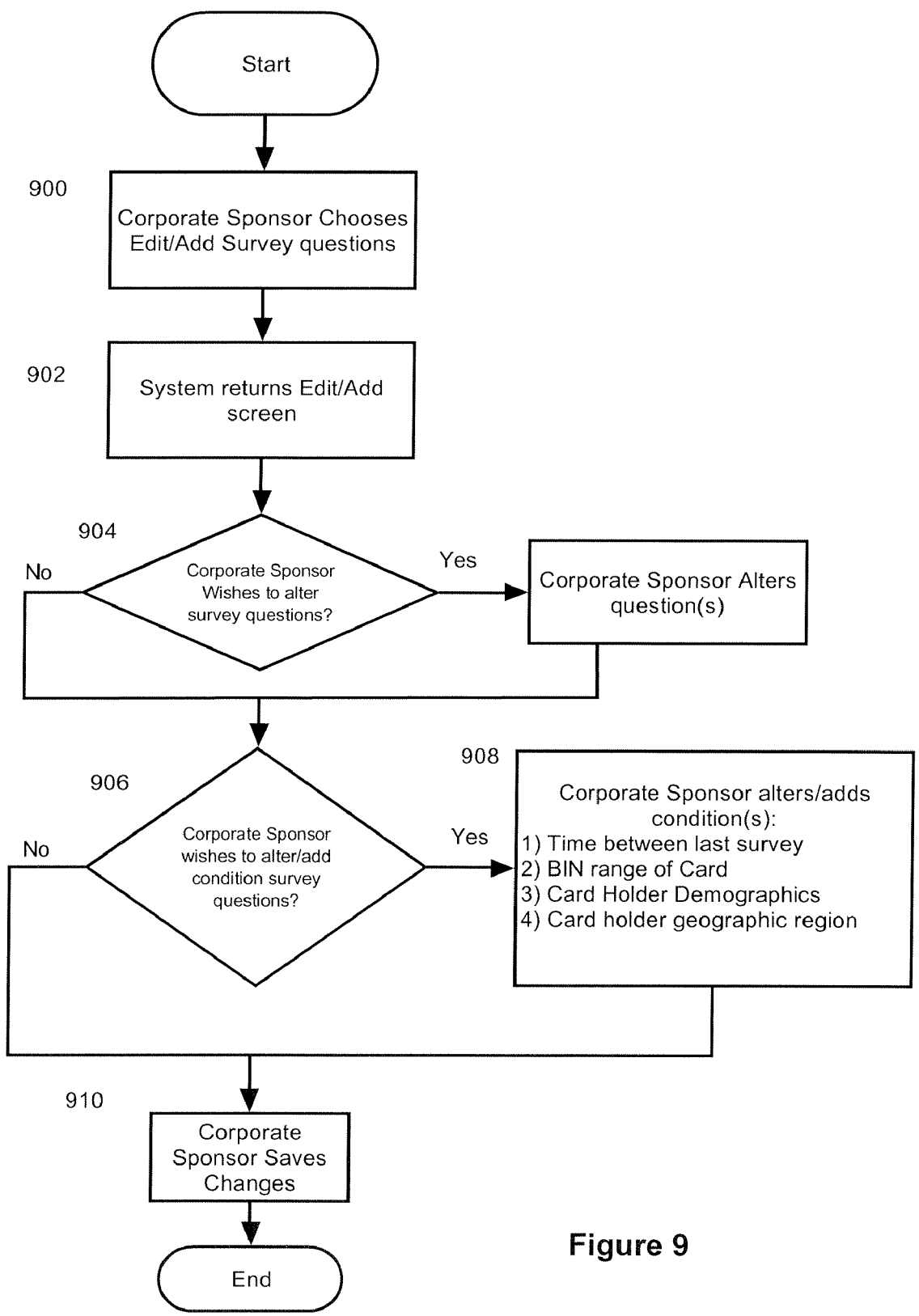
FIG. 9 is a flowchart illustrating a particular embodiment of the method of the present invention, according to which a corporate sponsor may generate survey questions and set conditions for the survey questions.
Figure 10:
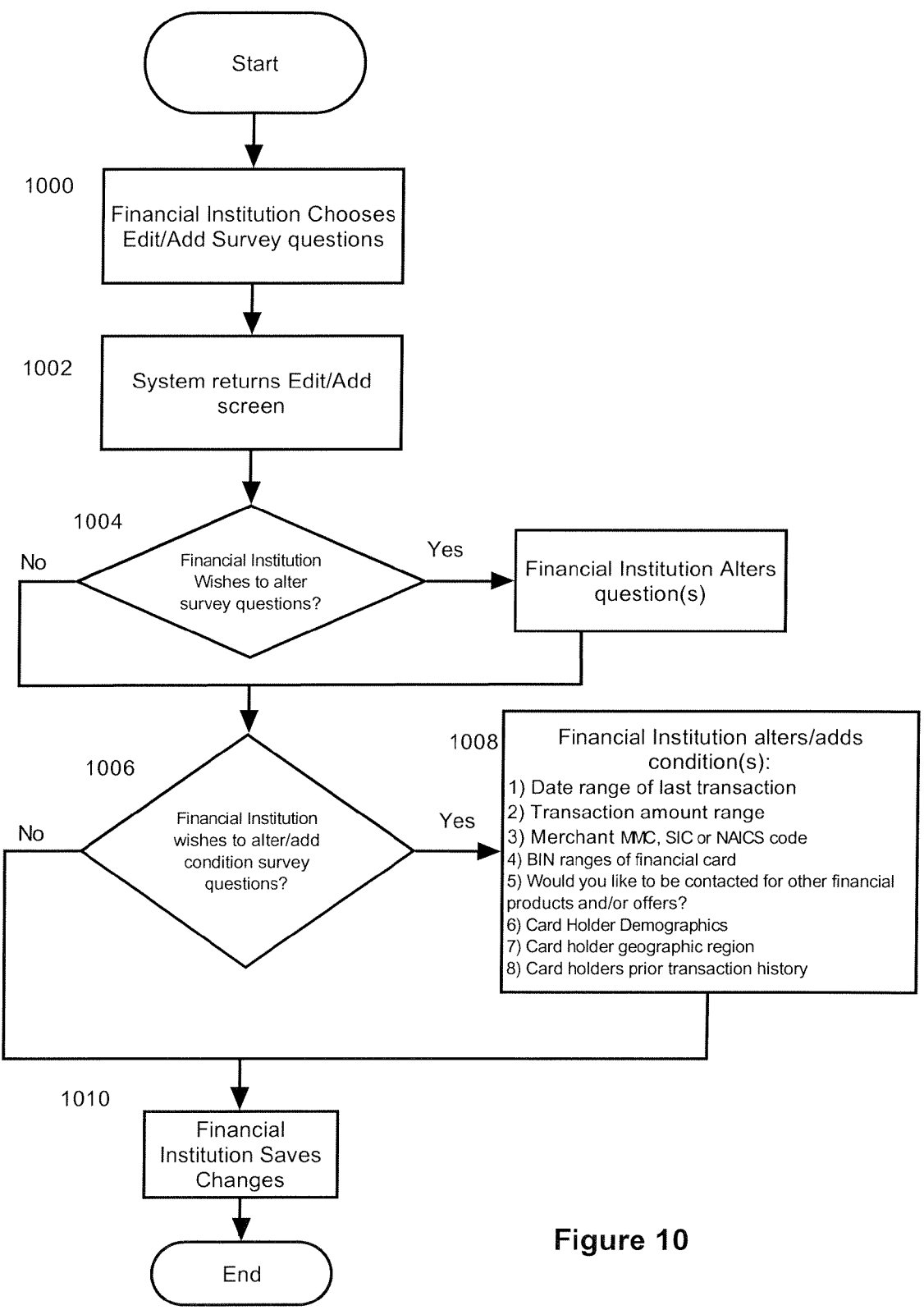
FIG. 10 is a flowchart illustrating a particular embodiment of the method of the present invention, according to which a financial institution may generate transaction survey questions and set conditions for the transaction survey questions.
Figure 11:
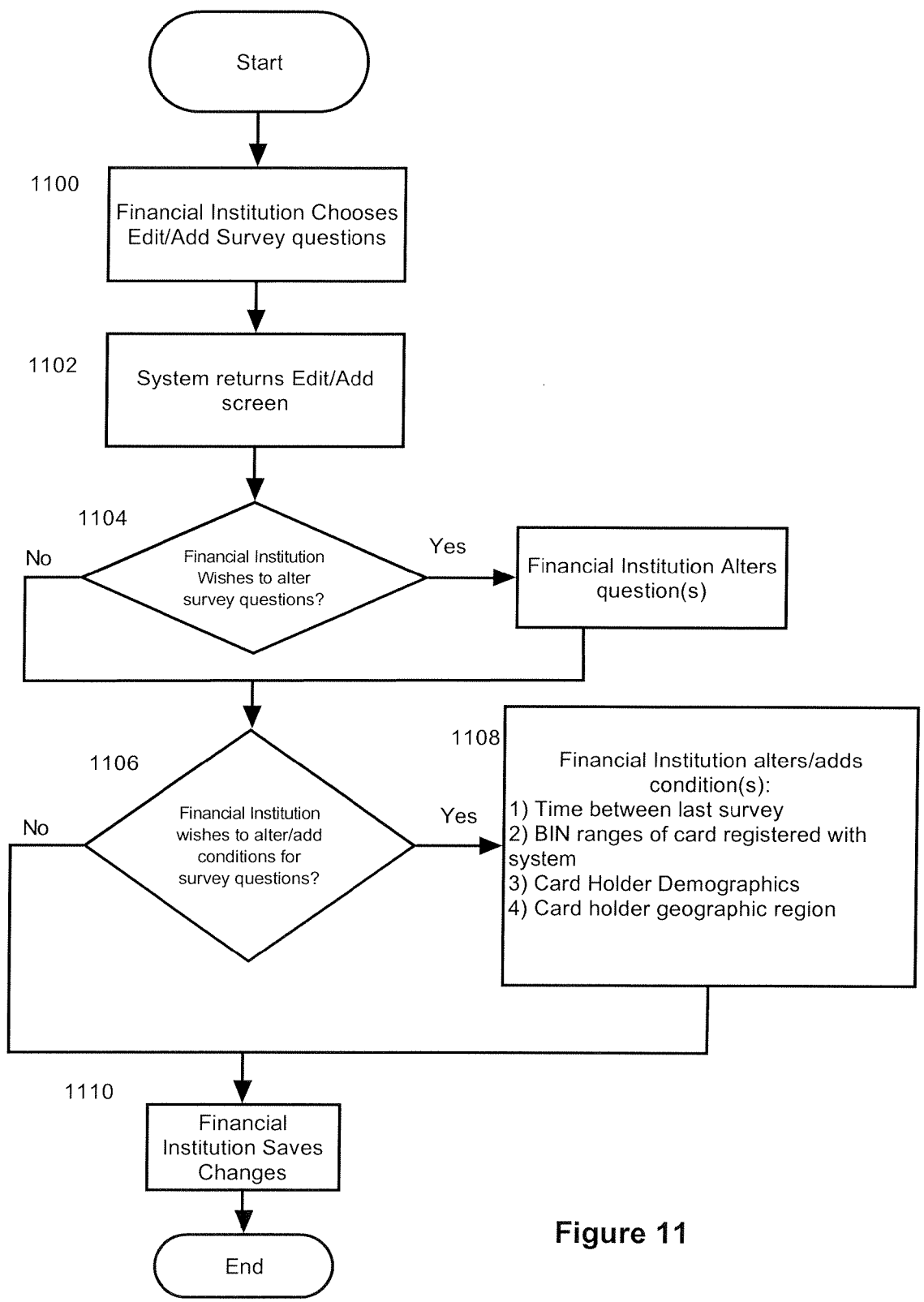
FIG. 11 is a flowchart illustrating a particular embodiment of the method of the present invention, according to which a financial institution may generate survey questions and set conditions for the survey questions.
Figure 13:
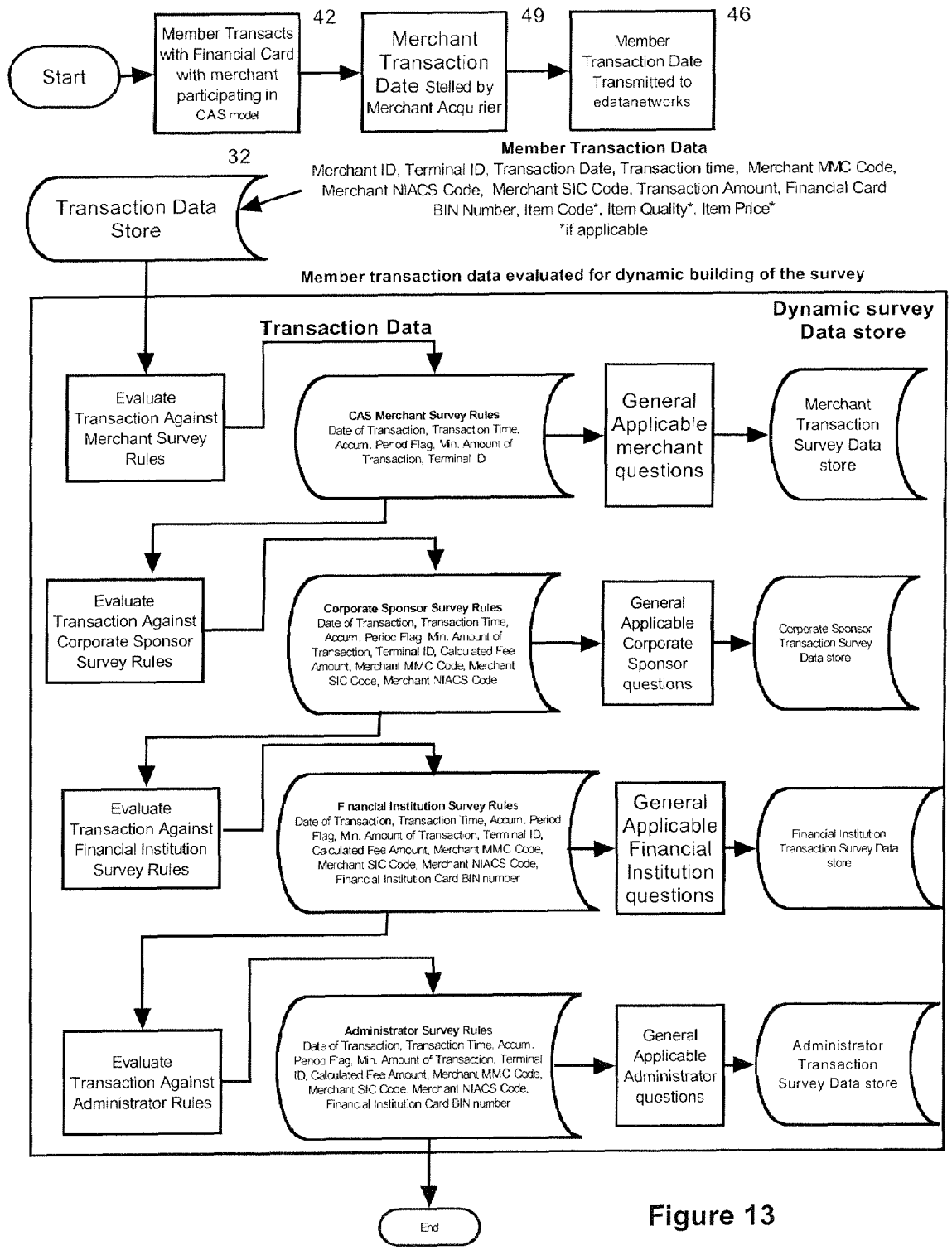
FIG. 13 is a flowchart illustrating a particular embodiment of the method of the present invention, according to which a transaction may invoke survey rules.
Figure 14:
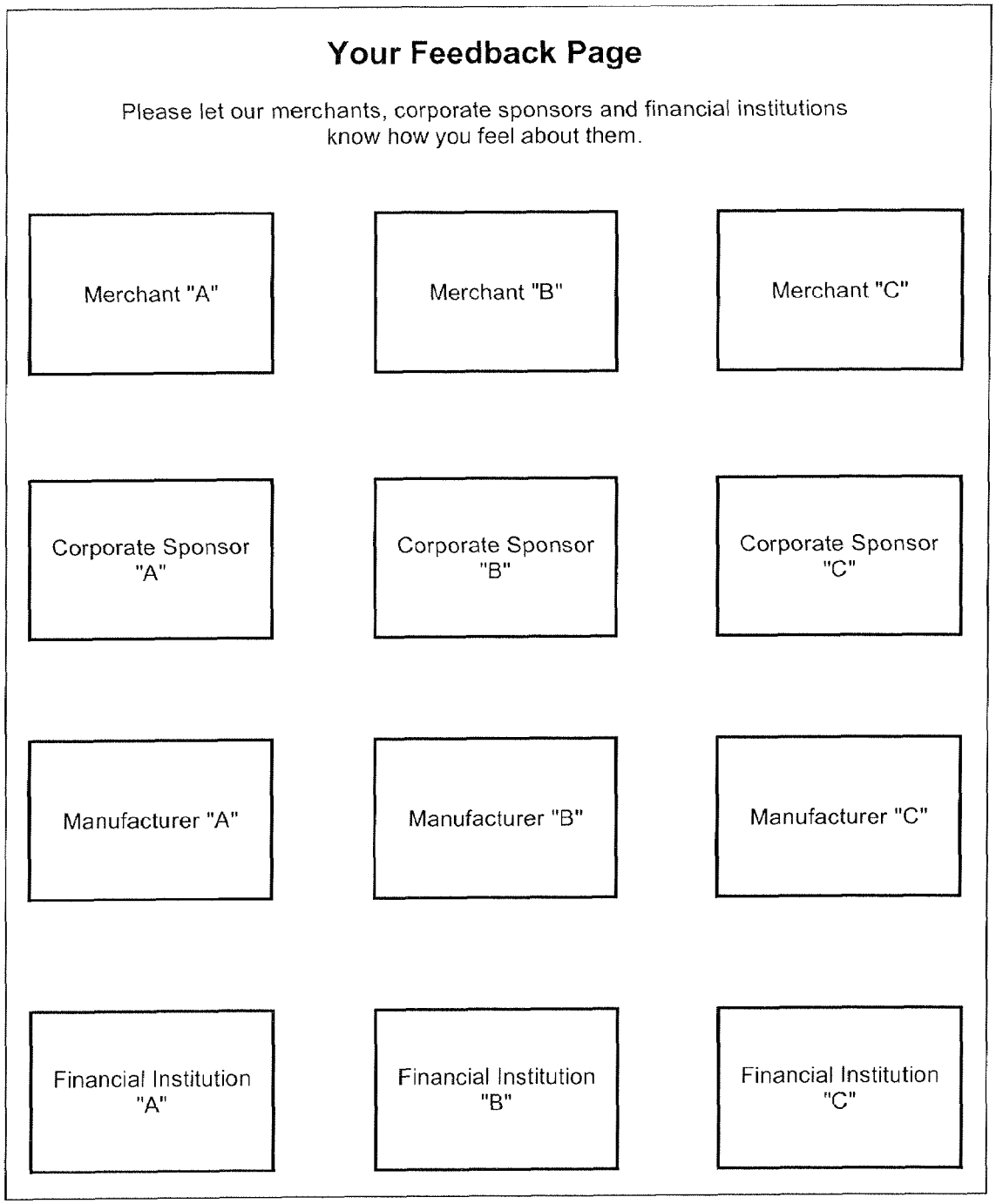
FIG. 14 illustrates an example feedback survey of the present invention.
Figure 15:
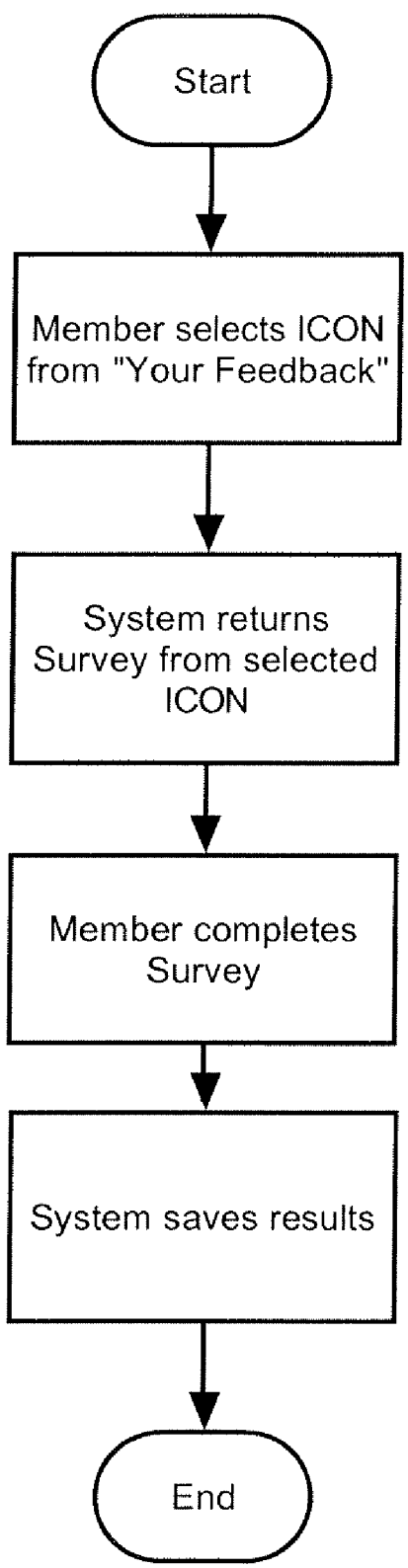
FIG. 15 is a flowchart illustrating a particular embodiment of the method of the present invention, according to which a feedback survey may be selected and accessed.
Figure 16:
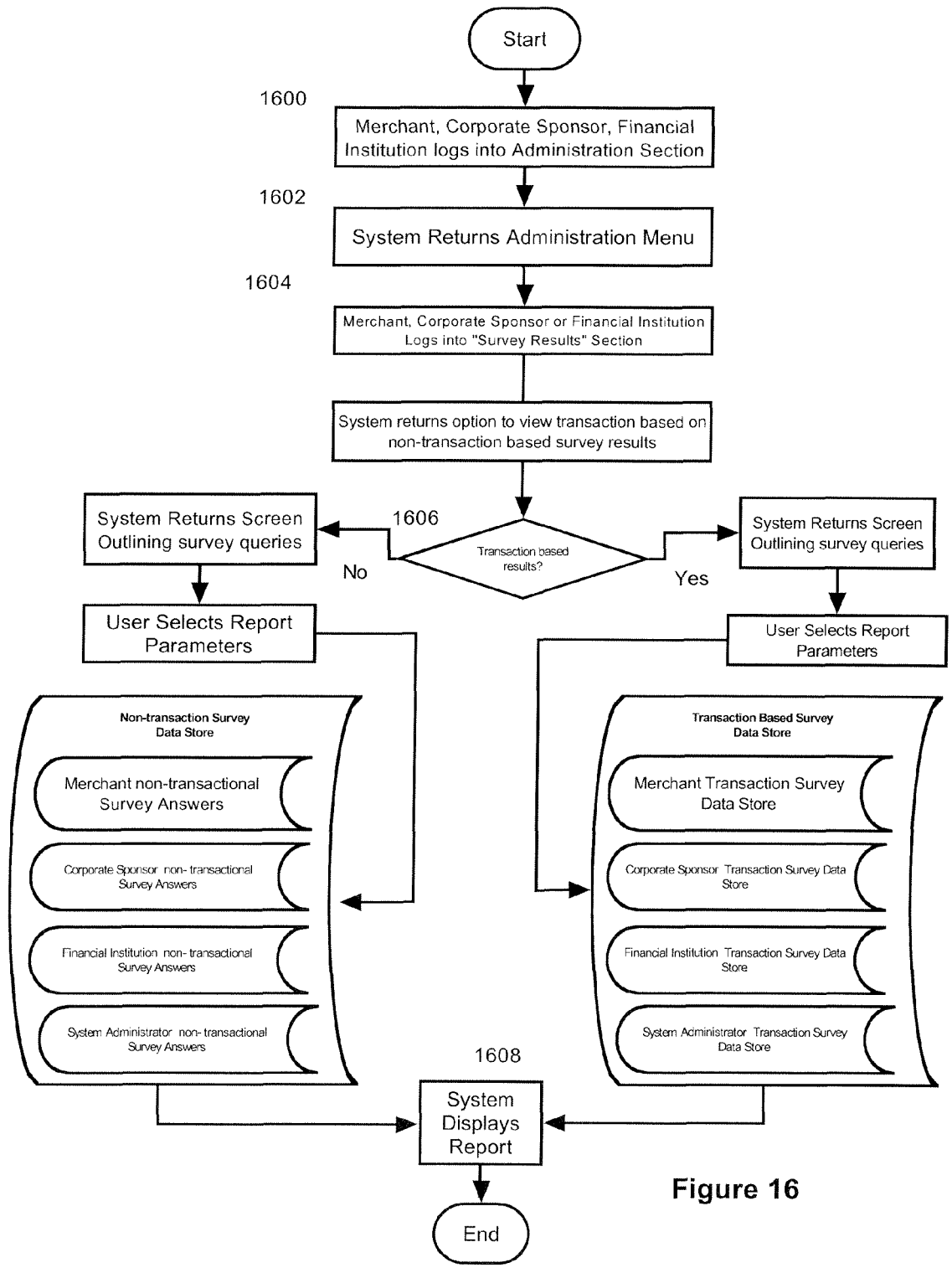
FIG. 16 is a flowchart illustrating a particular embodiment of the method of the present invention, according to which a report may be generated and displayed.

FIG. 4d illustrates one particular process and system implementation for customizing loyalty programs involving cardholders, specifically a system administrator for the operator of the loyalty system adjusting the parameters associated with reward generation in connection with specific members.

In a particular aspect of the present invention, the cardholder benefits processing utility (30) is further associated with a means for processing financial transactions (or transaction utility (not shown) that is operable to conduct electronic transactions between loyalty system and the card issuer (for example via the card issuer system (38)) possibly also between the loyalty system and the merchant acquirer (for example via the merchant acquirer system (40).

Examples in Operation

It should be understood that the cost of acquiring new customers is generally quite high, and this is a cost that merchants tend to monitor very closely. Particularly if a merchant's relationship with card issuers by operation of the present invention permits the merchant to acquire a new customer through the card issuer, merchants will generally be willing to provide to the cardholder and/or to the card issuer relatively significant benefits in consideration of obtaining the new customer. It should be understood that the present invention enables a merchant to target benefits to particular sub-groups of cardholders, depending on their interest to merchant, as explained herein.

A cardholder whose BIN number is associated with the program goes to a merchant who is also associated with the program. Within the loyalty system, the cardholder (in one particular implementation of the present invention) is given a code to be presented at the merchant's location that reflects a discount offer. Upon payment the cardholder receives a discount on monies owed. The cardholder in the above example is also given an additional item from the merchant's inventory as recognition for the cardholder being a member of the applicable loyalty program.

After the cardholder transaction has been completed the transaction data is relayed to the loyalty system and the cardholder benefits processing utility (34) is operable to automatically offer prize entries as a follow up to the cardholder's purchase, based on the loyalty program rules defined by the merchant.

In one particular implementation of the present invention, after the cardholder transaction has been completed the transaction data is relayed to the system. The loyalty system defines in accordance with a particular loyalty program a set of rules to complement existing points programs by converting the transaction data (e.g. identified merchant, amount of transaction, date of transaction, time of transaction) to convert the transaction into points in connection with the applicable card issuer's BIN range point program and based upon parameters set by each participating merchant. For instance, the system may convert transaction incentives or prizes within the loyalty program to points provided through the card issuer to the cardholder based on a pre-determined formula (usually based on an arrangement between the card issuer and the merchants, facilitated by the operator of the loyalty system). The loyalty system would for example convert a $100.00 spent by a cardholder under a loyalty program into 100 points if the transaction was completed between the hours of 00:00:00 and 12:00:00 Monday through Friday and 50 points at any other time for the particular card used at a particular merchant.

The cardholder in the above example visits a merchant participating in the loyalty system. The cardholder chooses to use the financial card that is registered with the loyalty system over other financial cards, and completes a transaction. The loyalty system identifies the merchant, the date, the amount and optionally the time of day and the terminal ID and also establishes any accrued benefits including points, prizes or discounted offers, as already explained. It should be understood that the card issuer in this case receives additional revenue from increased card use as the cardholder chooses the registered card issuers' card over another financial card.

In a particular implementation of the present invention, the loyalty system allows for the existing point programs operated by the card issuer to be identified and supported within the loyalty system. This occurs when, after conversion of incentives (for example) into points as described above, the card issuer then applies additional incentives through its own point system thereby creating an enhanced points program.

It should be understood that it is possible that the card issuer would chart they operator of the loyalty system (or the merchants themselves) for access to BIN ranges of cardholders. The charges could depend on the efforts expended by the card issuer to encourage cardholders to enroll in the loyalty program. Or, the card issuer may elect to charge differing amounts for loyalty system access depending on the demographics of particular cardholders.

A card issuer increases its revenue by offering incentives to consumers to use a particular financial card with a greater number of merchants. Merchants associated with the loyalty system provide incremental incentives to cardholders in certain BIN ranges. This way the card issuer and the loyalty system cooperate to bring more business to the common group.

In a specific implementation of the present invention, the card issuers may elect to charge the cardholders an annual fee to carry a financial card that is associated with a particular BIN range, and thereby also eligible for certain richer benefits in connection with a loyalty program. The additional annual fees represent an important source of additional revenue to the card issuer.

As previously stated, a merchant belonging to the loyalty system may choose to offer rewards/incentives based upon time of day and date. The merchant's merchant acquirer provides selected information relating to particular BIN ranges, transactions, dates and times. The loyalty system identifies the merchant, the time of day and the date and applies differential incentives either through the loyalty system or in the form of differential points transferred by to the card issuer for the cardholder.

The merchant through the loyalty system contracts with the merchant acquirer for anticipated additional transactions from a particular set of BIN numbers. The merchant acquirer is rewarded for the service in the form of a transaction fee or monthly fee through the loyalty system. The merchant may pay a differential rate for an access to a particular BIN as the cardholders to a particular BIN may offer a greater opportunity for transactions.

A merchant acquirer may realize additional revenues due to differing transaction fees associated with differing BIN number acceptance as a form of payment by a participating merchant. The merchant acquirer may elect to charge differing transaction fees for acceptance of cards within certain BIN range of a participating card issuer.

It should be understood that one of the advantages of the present invention is that the described loyalty system and method provides an opportunity for merchants, and for card issuers if they are willing, to efficiently operate and maintain their own loyalty program that provides the ability to share customers through cross-promotion between card issuers and merchants, and also cross-promotion between merchants involving cardholders who become members. The present invention enables card issuers and merchants to obtain direct customer feedback and to perceive measured results regarding customer transactions at each merchant, including bases on analysis of BIN number ranges by operation of the loyalty system of the present invention.

In another aspect of the present invention, the card issuers are provided with an economic interest to motivate the cardholders to become members of the loyalty system and to transact with merchants in order for the cardholders who are members to obtain benefits from the merchants (or from the card issuer based on an arrangement with the merchants). Again, customers of a co-branded card for example are identified within the loyalty system by means of their financial card BIN range number through the registration process, thereby enabling subsequent transactions involving particular cardholders and particular merchants to be tracked and measured results to be proven to card issuers and merchants alike.

It should be understood that benefits in accordance with the present invention can be accrued on behalf of members (including members who are cardholders) in a number of ways. The benefits themselves can vary. In a particular aspect of the present invention, pre-set benefit application or payment rates are associated with particular transactions associated with the loyalty system, as described in the Co-Pending Patent Application.

It should also be understood that within the loyalty system, merchants are motivated to develop new and innovative loyalty programs that will automatically be accessible to cardholders in accordance with the present invention. This saves the card issuer the time and resources generally required to devise new loyalty programs and enter into associated arrangements with their partners, often separately for each program.

Accordingly, the present invention is best understood as a means of generating financial transactions and/or customers for financial institutions or merchants, or both.

It should also be understood that the loyalty system provides flexibility in the arrangements made by the merchants, or in fact in some bases between the merchants and the card issuers, as it relates to the benefits provided to cardholders who become members. These arrangements can define the pre-determined benefits associated with particular transactions, e.g. a per transaction benefit to the cardholder or in fact to the card issuer. As such, the present invention provides a potential source of new revenue for the card issuer to the extent that not all of the benefits earmarked for cardholders' transactions is actually passed on to the cardholders.

It should be understood that it is open to the card issuer to also provide benefits to cardholders in connection with transactions associated with the loyalty system. For example, card issuers may want to enhance benefits available from merchants in connection with specific transactions with benefits that they are themselves providing because for example the impact of client retention of a preferred customer who is a golfer might be enhanced if a benefit from the card issuer is provided specifically in connection with a transaction that brings happiness to the golfer, i.e. golf. Alternatively, the card issuer could "top up" benefits provided by merchants, thereby enhancing the merchant's relationship with the cardholder who is a member, if the merchant is a customer of the card issuer or a related entity of the card issuer.

Consequently, the loyalty system, at little or no additional cost, can be used as a means of generating additional new business for the card issuer.

In a particular aspect of the present invention, the loyalty system effectively permits some merchants who would otherwise not be able to enter into co-branded card type arrangements (e.g. because of start up costs or because of the merchant is a regional retailer where the merchant might not otherwise be attractive to a large financial institution). Accordingly, the present invention allows regional merchants to compete better against national chains.

This invention provides a loyalty program with a low cost way to acquire customers and pay for them over future transactions. It also provides the co-branded partner the ability to expand transactions on the current card base, both from the initial referrals and subsequent transactions resulting from cross promotional offers within the loyalty system among other merchants.

By operation of the present invention, a financial card can be moved to the front of the wallet to be used for more transactions.

In another particular aspect of the present invention, cardholders of selected co-branded financial cards become members where the co-branded partners' service or product is not really competitive with the loyalty system merchants. Accordingly, use of co-branded cards in connection with the described loyalty system protects transaction market share for both the card issuer and co-branded partners' market share.

The card issuer, the co-branded partner and the merchants of the loyalty program increase their customer transactions through sharing customers.

It should be evident from the above that the flexibility that is provided to card issuers and merchants to devise, implement, and then measure the effectiveness of, various cross-promotional initiatives, can dramatically increase the returns on investment of card issuers and merchants alike, in connection with their customer retention and customer acquisition activities.

Other implementations and extensions of the invention are possible. For example, it should be understood that the present invention contemplates use of various security methods and technologies for restricting access to resources of the loyalty system to those authorized to do so by the operator of the loyalty system; the use of various existing and future technologies to process payments by operation of the transaction utility (38); various tools and interfaces for interacting with the loyalty system in accordance with the method of the present invention. The system also allows for robust reporting which may include comparative reports of member affinity or of transaction history with participating merchants. In other words, member transaction history may be different for differing groups of members based on member affinity.

The embodiments of the invention in which an exclusive property or privilege is claimed are defined as follows:

1. A method for enabling a loyalty program to be linked to one or more card issuers, and thereby their cardholders, by operation of a loyalty system, the loyalty system being operable to enable the creation, implementation and management of one or more loyalty programs that provide benefits to members of the loyalty programs in connection with transactions between the members and one or more merchants associated with the loyalty system, the method comprising the steps of:
   (a) registering on the loyalty system one or more card issuers;
   (b) the operator of the loyalty system, the one or more card issuers, and the merchants establishing the rules for accrual and processing of benefits from the merchants to cardholders associated with the one or more card issuers in connection with transactions between the cardholders and the merchants with the loyalty system;
   (c) registering on the loyalty system one or more merchant acquirers associated with the one or more card issuers;
   (d) registering a plurality of the cardholders as members of the loyalty program;
   (e) applying the rules to accrue and process the benefits of cardholders in connection with the transactions between the cardholders and the merchants, by operation of the loyalty system; and
   (f) providing an option for the benefits to be paid to the card issuers, said card issuers optionally retaining a portion of the benefits, thereby providing an additional source of revenue to the card issuers.

2. The method of claim 1, wherein the rules for accrual and processing of benefits are established by:
   (a) the operator of the loyalty system establishing the parameters of the rules, and implementing such parameters to the loyalty system;
   (b) the operator of the loyalty system entering into an agreement with the one or more card issuers that establishes the particular rules for accrual and processing of benefits that are consistent with the parameters of the rules; and
   (c) the operator of the loyalty system entering into an agreement with each of the merchants establishing between the loyalty system and the merchants the rules for accrual and processing of benefits, such rules for particular cardholders being consistent with the agreement entered into between the operator of the loyalty system and the respective card issuers.

3. The method of claim 1, comprising the further steps of:
   (a) identifying a transaction between a cardholder and a merchants as being subject to the rules for accrual and processing of benefits; and
   (b) processing the rules and accruing the benefits to a benefits account associated in the loyalty system with the cardholder.

4. The method of claim 3, comprising the further step of enabling the cardholder to process benefits by operation of the loyalty system, such processing including:
   (a) redemption of benefits;
   (b) accumulation of benefits;
   (c) conversion of benefits; and/or
   (d) transfer of benefits.

5. The method of claim 1, comprising the further step of enabling merchants to, within parameters defined by the operator of the loyalty system, modify the rules for accruing and processing benefits so as to optimize the one or more loyalty programs.

6. The method of claim 1, wherein the loyalty system is operable to differentiate between cardholders based on BIN ranges, and thereby enable merchants to target loyalty programs, or aspects of loyalty programs, to cardholders within specific BIN ranges.

7. The method of claim 1, wherein the loyalty programs operate in parallel to other loyalty programs, including one or more loyalty programs operated by the card issuers.

8. The method of claim 1, wherein the loyalty system operates as a secondary loyalty system in addition to other loyalty system(s) of the card issuers, the loyalty system being operable to enable the card issuers to direct the loyalty programs to cardholders as secondary loyalty programs in addition to other loyalty program(s) provided by their other loyalty system(s).

9. The method of claim 8, wherein the loyalty system includes a point conversion utility that enables cardholders to convert benefits to points associated with the card issuers' other loyalty program(s).

10. The method of claim 1, comprising the further step of linking the loyalty system with systems associated with each of the card issuers and/or the merchant acquirers, thereby providing a combined data set regarding transactions between the cardholders and the merchants to the loyalty system.

11. The method of claim 10, comprising the further step of enabling merchants to incorporate in the loyalty programs location based and/or time based rules for accruing benefits.

12. The method of claim 1, wherein the method enables card issuers and merchants to share risk and costs associated with directing loyalty programs to the cardholders.

13. The method of claim 1, comprising the further step of the card issuer opting to be paid benefits re-distributing the benefits to one or more of the cardholders in accordance with the transactions.

* * * * *